(12) United States Patent
Zou et al.

(10) Patent No.: US 12,392,997 B2
(45) Date of Patent: Aug. 19, 2025

(54) OPTICAL SYSTEM, IMAGE CAPTURING MODULE, AND ELECTRONIC DEVICE

(71) Applicant: JIANGXI JINGCHAO OPTICAL CO., LTD., Nanchang (CN)

(72) Inventors: Jinhua Zou, Nanchang (CN); Ming Li, Nanchang (CN); Hairong Zou, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 762 days.

(21) Appl. No.: 17/614,359

(22) PCT Filed: Apr. 8, 2020

(86) PCT No.: PCT/CN2020/083697
§ 371 (c)(1),
(2) Date: Nov. 25, 2021

(87) PCT Pub. No.: WO2021/203277
PCT Pub. Date: Oct. 14, 2021

(65) Prior Publication Data
US 2022/0236535 A1    Jul. 28, 2022

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01); *G02B 13/006* (2013.01)

(58) Field of Classification Search
CPC ..... G02B 13/0045; G02B 9/62; G02B 13/006
See application file for complete search history.

(56) References Cited

U.S. PATENT DOCUMENTS

| | | |
|---|---|---|
| 4,981,344 A | 1/1991 | Ueda |
| 6,414,800 B1 | 7/2002 | Hamano |
| (Continued) | | |

FOREIGN PATENT DOCUMENTS

| | | |
|---|---|---|
| CN | 1206842 A | 2/1999 |
| CN | 1297164 A | 5/2001 |
| (Continued) | | |

OTHER PUBLICATIONS

Wikipedia webpage "Doublet (lens)" as of 2019 (Year: 2019).*
(Continued)

*Primary Examiner* — George G. King
(74) *Attorney, Agent, or Firm* — Franklin & Associates International Inc; Matthew F. Lambrinos

(57) ABSTRACT

An optical system includes a first lens having a positive refractive power; a second lens having a refractive power; a third lens having a negative refractive power and an object side surface and an image side surface being concave at circumferences; a fourth lens having a negative refractive power; a fifth lens having a positive refractive power and an object side surface and an image side surface being aspherical, and at least one of the object side surface and the image side surface having an inflection point; and a sixth lens having a negative refractive power. $0.60 < CT1/SD11 < 1.01$; $5.5 < TTL/CT1 < 9.0$; CT1 is a thickness of the first lens, SD11 is half of a maximum effective aperture of an object side surface of the first lens, TTL is a distance from the object side surface of the first lens to an imaging plane.

18 Claims, 7 Drawing Sheets

(56) References Cited

U.S. PATENT DOCUMENTS

| | | | |
|---|---|---|---|
| 6,985,309 | B2 | 1/2006 | Shinohara |
| 9,057,868 | B1 | 6/2015 | Chung et al. |
| 2004/0218285 | A1 | 11/2004 | Amanai |
| 2004/0264003 | A1 | 12/2004 | Noda |
| 2005/0046970 | A1 | 3/2005 | Amanai |
| 2008/0106801 | A1 | 5/2008 | Kang et al. |
| 2010/0254029 | A1 | 10/2010 | Shinohara |
| 2012/0075718 | A1 | 3/2012 | Seo |
| 2014/0063620 | A1 | 3/2014 | Jung et al. |
| 2014/0153113 | A1* | 6/2014 | Tsai .................. G02B 9/62 359/713 |
| 2015/0138425 | A1 | 5/2015 | Lee et al. |
| 2016/0124192 | A1 | 5/2016 | Koreeda |
| 2016/0161709 | A1 | 6/2016 | Hsueh et al. |
| 2017/0307858 | A1 | 10/2017 | Chen |
| 2018/0039046 | A1* | 2/2018 | Lee .................. G02B 13/0045 |
| 2018/0113282 | A1 | 4/2018 | Tsai |
| 2018/0307000 | A1* | 10/2018 | Lai .................... G02B 9/04 |
| 2020/0073092 | A1 | 3/2020 | Chen et al. |
| 2020/0142158 | A1* | 5/2020 | Yao ................... G02B 13/04 |
| 2020/0209542 | A1* | 7/2020 | Hsueh ............... G02B 15/167 |
| 2021/0084236 | A1* | 3/2021 | Han ................... G06V 40/67 |

FOREIGN PATENT DOCUMENTS

| | | | |
|---|---|---|---|
| CN | 101093274 | A | 12/2007 |
| CN | 101983348 | A | 3/2011 |
| CN | 102132189 | A | 7/2011 |
| CN | 102419470 | A | 4/2012 |
| CN | 102466864 | A | 5/2012 |
| CN | 202522758 | U | 11/2012 |
| CN | 102914851 | A | 2/2013 |
| CN | 102985865 | A | 3/2013 |
| CN | 102998774 | A | 3/2013 |
| CN | 103676088 | A | 3/2014 |
| CN | 103852858 | A | 6/2014 |
| CN | 103969804 | A | 8/2014 |
| CN | 104570277 | A | 4/2015 |
| CN | 104570295 | A | 4/2015 |
| CN | 104914558 | A | 9/2015 |
| CN | 104932086 | A | 9/2015 |
| CN | 204631345 | U | 9/2015 |
| CN | 105259636 | A | 1/2016 |
| CN | 105372793 | A | 3/2016 |
| CN | 105607232 | A | 5/2016 |
| CN | 105607233 | A | 5/2016 |
| CN | 205210492 | U | 5/2016 |
| CN | 205210493 | U | 5/2016 |
| CN | 105988185 | A | 10/2016 |
| CN | 105988186 | A | 10/2016 |
| CN | 106033141 | A | 10/2016 |
| CN | 106154496 | A | 11/2016 |
| CN | 106338815 | A | 1/2017 |
| CN | 106526796 | A | 3/2017 |
| CN | 206074890 | U | 4/2017 |
| CN | 106610518 | A | 5/2017 |
| CN | 106646825 | A | 5/2017 |
| CN | 106772931 | A | 5/2017 |
| CN | 106773008 | A | 5/2017 |
| CN | 106802469 | A | 6/2017 |
| CN | 106842512 | A | 6/2017 |
| CN | 106842514 | A | 6/2017 |
| CN | 106896474 | A | 6/2017 |
| CN | 106959500 | A | 7/2017 |
| CN | 106970464 | A | 7/2017 |
| CN | 107024756 | A | 8/2017 |
| CN | 107102425 | A | 8/2017 |
| CN | 107167897 | A | 9/2017 |
| CN | 107167902 | A | 9/2017 |
| CN | 206460205 | U | 9/2017 |
| CN | 107290843 | A | 10/2017 |
| CN | 206946078 | U | 1/2018 |
| CN | 107703609 | A | 2/2018 |
| CN | 107831588 | A | 3/2018 |
| CN | 207164341 | U | 3/2018 |
| CN | 107976770 | A | 5/2018 |
| CN | 108089278 | A | 5/2018 |
| CN | 108089317 | A | 5/2018 |
| CN | 207424362 | U | 5/2018 |
| CN | 207424363 | U | 5/2018 |
| CN | 108107548 | A | 6/2018 |
| CN | 108227146 | A | 6/2018 |
| CN | 207557562 | U | 6/2018 |
| CN | 108459394 | A | 8/2018 |
| CN | 108761745 | A | 11/2018 |
| CN | 108873250 | A | 11/2018 |
| CN | 109283665 | A | 1/2019 |
| CN | 109375346 | A | 2/2019 |
| CN | 208506348 | U | 2/2019 |
| CN | 109407267 | A | 3/2019 |
| CN | 109725406 | A | 5/2019 |
| CN | 109752823 | A | 5/2019 |
| CN | 109814234 | A | 5/2019 |
| CN | 109814235 | A | 5/2019 |
| CN | 208833988 | U | 5/2019 |
| CN | 208872939 | U | 5/2019 |
| CN | 208888449 | U | 5/2019 |
| CN | 109870786 | A | 6/2019 |
| CN | 109870788 | A | 6/2019 |
| CN | 109917533 | A | 6/2019 |
| CN | 110018556 | A | 7/2019 |
| CN | 209070186 | U | 7/2019 |
| CN | 110109226 | A | 8/2019 |
| CN | 110208927 | A | 9/2019 |
| CN | 110261997 | A | 9/2019 |
| CN | 110398815 | A | 11/2019 |
| CN | 110426822 | A | 11/2019 |
| CN | 110531500 | A | 12/2019 |
| CN | 110568583 | A | 12/2019 |
| CN | 110618522 | A | 12/2019 |
| CN | 209765129 | U | 12/2019 |
| CN | 110646919 | A | 1/2020 |
| CN | 110646921 | A | 1/2020 |
| CN | 110794555 | A | 2/2020 |
| CN | 110879454 | A | 3/2020 |
| CN | 111007649 | A | 4/2020 |
| CN | 111025600 | A | 4/2020 |
| CN | 111308688 | A | 6/2020 |
| CN | 111338057 | A | 6/2020 |
| CN | 210720853 | U | 6/2020 |
| CN | 111399186 | A | 7/2020 |
| CN | 211786331 | U | 10/2020 |
| KR | 1020140135909 | A | 11/2014 |
| TW | 201350956 | A | 12/2013 |
| TW | I625567 | B | 6/2018 |
| TW | I640811 | B | 11/2018 |
| TW | I655474 | B | 4/2019 |
| WO | 2003046633 | A2 | 6/2003 |
| WO | 2014162779 | A1 | 10/2014 |
| WO | 2015159721 | A1 | 10/2015 |
| WO | 2017180362 | A1 | 10/2017 |

OTHER PUBLICATIONS

Eckhardt Optics webpage "Basic Optics Terms" https://www.eckop.com/resources/optics/basic-optics-terms/#:~:text=Image%20height%20is%20defined%20as,divided%20by%20the%20object%20height. (Year: 2019).*
Sunex Inc. webpage "Lens Image Circle" https://sunex.com/2019/08/01/lens-image-circle/ (Year: 2019).*
International Search Report dated on Jan. 15, 2020 on International Patent Application PCT/CN2019/110525, filed Jan. 3, 2020, in the name of Jiangxi Jingchao Optical Co. Ltd.
U.S. Appl. No. 17/284,467, 371 filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
U.S. Appl. No. 17/601,075, 371 filed Oct. 3, 2021, in the name of Jiangxi Jingchao Optical Co. Ltd.
International Search Report dated Mar. 27, 2019 on International

(56) References Cited

OTHER PUBLICATIONS

Patent Application PCT/CN2020/072135, filed Jan. 15, 2020, in the name of Jiangxi Jingchao Optical Co. Ltd.
U.S. Appl. No. 17/440,786, 371 filed Sep. 19, 2021, in the name of Jiangxi Jingchao Optical Co. Ltd.
U.S. Appl. No. 17/605,985, 371 filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, 371 Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.
International Search Report on International Patent Application PCT/CN2019/122072, filed Nov. 29, 2019, in the name of Jiangxi Jingchao Optical Co. Ltd.
U.S. Appl. No. 17/606,027, 371 filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
U.S. Appl. No. 17/606,040, 371 filed 24 October 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371 filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371 filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371 filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, 371 filed Nov. 13, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, 371 filed Nov. 14, 2021, in the name of Jiangxi Jingchao Optical Co. Ltd.
International Search Report on International Patent Application PCT/CN2020/103797, filed Jul. 23, 2020, in the name of OFilm Group Co. Ltd.
U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371 filed Nov. 16, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, 371 filed Nov. 26, 2021, in the name of OFilm Group Co. Ltd. and Jiangxi Jingchao Optical Co. Ltd.
U.S. Appl. No. 17/536,006, filed date Nov. 27, 2021, in the name of Jiangxi Jingchao Optical Co. Ltd.
U.S. Appl. No. 17/536,010, filed Nov. 27, 2021, in the name of Jiangxi Jingchao Optical Co. Ltd.

* cited by examiner

OPTICAL SYSTEM, IMAGE CAPTURING MODULE, AND ELECTRONIC DEVICE

CROSS REFERENCE TO RELATED APPLICATION

This application is a national stage of International Application No. PCT/CN2020/083697, filed on Apr. 8, 2020, and entitled "OPTICAL SYSTEM, IMAGE CAPTURING MODULE, AND ELECTRONIC DEVICE", the content of which is incorporated herein in entirety by reference.

TECHNICAL FIELD

The present disclosure relates to the field of photographing, and more particularly, to an optical system, an image capturing module, and an electronic device.

BACKGROUND

With the continuous development of electronic devices such as smart phones and tablet computers, photographing functions have become indispensable functions in the electronic devices. The volume of the electronic devices tends to become more and more miniaturized, which also puts forward higher requirements for the size of the optical system in the electronic devices. However, the head of the current camera lens is usually large, and it is difficult to meet the requirements of the miniaturization design of the electronic devices.

SUMMARY

According to various embodiments of the present disclosure, an optical imaging system, an image capturing module, and an electronic device are provided.

An optical system, sequentially arranged from an object side to an image side, includes:
- a first lens having a positive refractive power;
- a second lens having a refractive power;
- a third lens having a negative refractive power, an object side surface and an image side surface of the third lens being both concave at their circumferences;
- a fourth lens having a negative refractive power;
- a fifth lens having a positive refractive power, at least one of an object side surface and an image side surface of the fifth lens having an inflection point; and
- a sixth lens having a negative refractive power;
- the optical system satisfies the following relational expressions:

$$0.60 < CT1/SD11 < 1.01;$$

$$5.5 < TTL/CT1 < 9.0;$$

where $CT1$ is a thickness of the first lens on an optical axis, $SD11$ is half of a maximum effective aperture of an object side surface of the first lens, and $TTL$ is a distance from the object side surface of the first lens to an imaging plane of the optical system on the optical axis.

An image capturing module includes a photosensitive element and the optical system described above, and the photosensitive element is arranged on the image side of the optical system.

An electronic device includes a housing and the image capturing module described above, and the image capturing module is mounted on the housing.

The details of one or more embodiments of the present disclosure are set forth in the accompanying drawings and the description below. Other features, objects and advantages of the present disclosure will become apparent from the description, the accompanying drawings, and the claims.

BRIEF DESCRIPTION OF THE DRAWINGS

To better describe and illustrate the embodiments and/or examples of the disclosure disclosed herein, reference may be made to one or more accompanying drawings. The additional details or examples used to describe the accompanying drawings are not to be construed as limiting the scope of any one of the disclosed disclosure, the presently described embodiments and/or examples, and the presently understood preferred mode of the disclosure.

DETAILED DESCRIPTION OF THE EMBODIMENTS

In order to facilitate the understanding of the present disclosure, the present disclosure will be described more fully hereinafter with reference to the related accompanying drawings. Preferable embodiments of the present disclosure are presented in the accompanying drawings. However, the present disclosure may be embodied in many different forms and is not limited to the embodiments described herein. Rather, the purpose of providing these embodiments is to make the content of the present disclosure more thorough and comprehensive.

It should be noted that when an element is referred to as being "fixed to" another element, it can be directly fixed to another element or indirectly connected to another element with a mediating element. When an element is considered to be "connected to" another element, it can be directly connected to another element or indirectly connected to another element with a mediating element. The terms "in", "outer", "left", "right", and the like used herein are for illustrative purposes only and are not intended to be the only embodiments.

Figure 1:
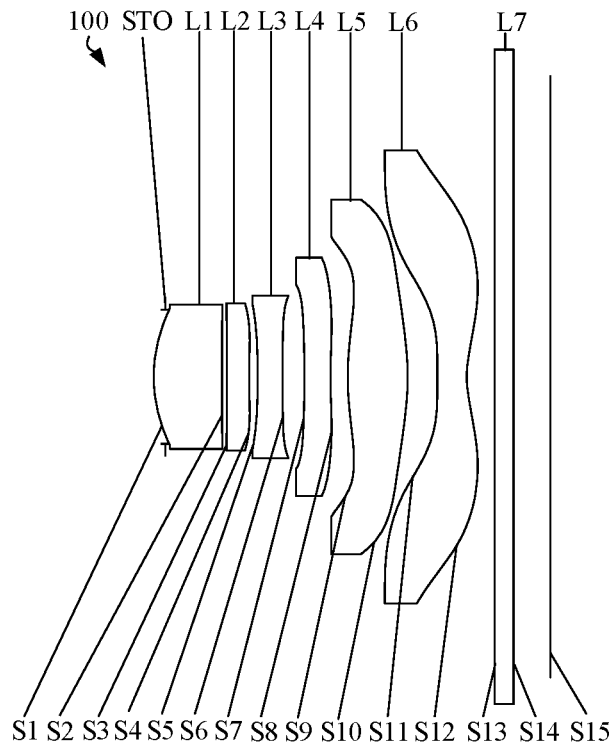
FIG. 1 is a schematic view of an optical system in a first embodiment of the present disclosure.

Referring to FIG. 1, in some embodiments of the present disclosure, an optical system 100 includes, sequentially arranged from an object side to an image side, a first lens L1, a second lens L2, a third lens L3, a fourth lens L4, a fifth lens L5, and a sixth lens L6. Specifically, the first lens L1 includes an object side surface S1 and an image side surface S2, the second lens L2 includes an object side surface S3 and an image side surface S4, the third lens L3 includes an object side surface S5 and an image side surface S6, the fourth lens L4 includes an object side surface S7 and an image side surface S8, the fifth lens L5 includes an object side surface S9 and an image side surface S10, and the sixth lens L6 includes an object side surface S11 and an image side surface S12.

The first lens L1 has a positive refractive power, and the second lens L2 has a refractive power. The third lens L3 has a negative refractive power, and the object side surface S5 and the image side surface S6 of the third lens L3 are both concave at their circumferences. The fourth lens L4 has a negative refractive power. The fifth lens L5 has a positive refractive power, and at least one of the object side surface S9 and the image side surface S10 of the fifth lens L5 has an inflection point to correct the aberration of the off-axis field of view and improve the imaging quality of the optical system 100. The lenses of the optical system 100 are arranged coaxially, and central axes of the lenses are on the same straight line, this straight line is an optical axis of the optical system 100.

In addition, in some embodiments, the optical system 100 is provided with an optical stop STO, and the optical stop STO may be arranged on an object side of the first lens L1. In some embodiments, the optical system 100 further includes an infrared filter L7 arranged on an image side of the sixth lens L6, and the infrared filter L7 includes an object side surface S13 and an image side surface S14. Further, the optical system 100 further includes an image plane S15 located on the image side of the sixth lens L6. Incident light can be imaged on the image plane S15 after being adjusted by the first lens L1, the second lens L2, the third lens L3, the fourth lens L4, the fifth lens L5, and the sixth lens L6. It is worth noting that the infrared filter L7 may be an infrared cut-off filter, which is configured to filter out interference light and prevent the interference light from reaching the image plane S15 of the optical system 100 and affecting normal imaging.

In some embodiments, the object side surfaces and the image side surfaces of the lenses of the optical system 100 are all aspherical surfaces. The use of the aspherical structure can improve the flexibility of the lens design, effectively correct spherical aberration, and improve imaging quality. In some other embodiments, the object side surface S9 and the image side surface S10 of the fifth lens L5 are both aspherical surfaces, while the object side surfaces and the image side surfaces of the remaining lenses of the optical system 100 may be all spherical surfaces. It should be noted that the aforementioned embodiments are merely examples of some embodiments of the present disclosure. In some embodiments, the surfaces of the remaining lenses in the optical system 100 may be any combination of aspherical surfaces or spherical surfaces.

In some embodiments, the lenses in the optical system 100 may be all made of glass or plastic. The use of plastic lenses can reduce the weight of the optical system 100 and reduce the production cost, which, in addition with the smaller size of the optical system, can achieve a light and miniaturization design of the optical system. The use of glass lenses enables the optical system 100 to have excellent optical performance and higher temperature resistance. It should be noted that the lenses in the optical system 100 can also be made of materials of any combination of glass and plastic, and not necessarily be all made of glass or plastic.

It should be noted that the first lens L1 does not mean that there is only one lens. In some embodiments, there may also be two or more lenses in the first lens L1, and the two or more lenses can form a cemented lens. A surface of the cemented lens closest to the object side can be regarded as the object side surface S1, and a surface of the cemented lens closest to the image side can be regarded as the image side surface S2. Alternatively, the lenses of the first lens L1 do not form a cemented lens, but the distances between the lenses are relatively fixed. In this case, an object side surface of the lens closest to the object side is the object side surface S1, and an image side surface of the lens closest to the image side is the image side surface S2. In addition, in some embodiments, the number of lenses in the second lens L2, the third lens L3, the fourth lens L4, the fifth lens L5, or the sixth lens L6 can also be greater than or equal to two, and any adjacent lenses can form a cemented lens or can be a non-cemented lens.

Further, in some embodiments, the optical system 100 satisfies a relational expression: $0.60<CT1/SD11<1.01$; where CT1 is a thickness of the first lens L1 on the optical axis, that is, a center thickness of the first lens L1, and SD11 is half of a maximum effective aperture of the object side surface S1 of the first lens L1. Specifically, CT1/SD11 may be 0.64, 0.69, 0.73, 0.75, 0.82, 0.86, 0.89, 0.91, 0.93, or 0.98. When the above relational expression is satisfied, the first lens L1 can be reasonably configured, so that the head of the camera lens is smaller, thereby satisfying the requirements of the miniaturization design of the electronic device.

In some embodiments, the optical system 100 satisfies a relational expression: $5.5<TTL/CT1<9.0$; where CT1 is the thickness of the first lens L1 on the optical axis, and TTL is a distance from the object side surface S1 of the first lens L1 to the image plane S15 on the optical axis. Specifically, TTL/CT1 may be 5.81, 5.92, 6.31, 6.58, 6.85, 6.92, 7.12, 7.34, 7.58, or 7.69. When the above relational expression is satisfied, the first lens L1 and a total system length of the optical system 100 can be reasonably configured, the total system length of the optical system 100 can be made smaller while ensuring that the head of the camera lens is small, which further satisfies the requirements of the miniaturization design of the electronic devices. In addition, it can also be ensured that the first lens L1 has a sufficient thickness, so that the yield rate of the first lens L1 during processing and molding is higher, and thus the yield rate of the assembly of the optical system 100 is further improved.

In some embodiments, the optical system 100 satisfies a relational expression: $2.2 \leq FNO \leq 2.6$; where FNO is an f-number of the optical system 100. Specifically, the FNO may be 2.30, 2.32, 2.36, 2.39, 2.41, 2.47, 2.48, 2.51, 2.53, or 2.55. When the above relational expression is satisfied, while ensuring that the optical system 100 has a sufficient amount of light flux, it is also beneficial to make the head of the camera lens smaller.

In some embodiments, the optical system 100 satisfies a relational expression: $1<|f3/f4|<10$; where f3 is an effective focal length of the third lens L3, and f4 is an effective focal length of the fourth lens L4. Specifically, |f3/f4| may be 1.336, 1.735, 2.208, 2.896, 3.528, 3.619, 4.626, 5.462, 7.264, or 9.218. When the above relational expression is satisfied, the third lens L3 and the fourth lens L4 can be reasonably configured, so as to effectively expand the field of view of the optical system 100, thereby reducing the total system length of the optical system 100, and satisfying the requirements of the miniaturization design.

In some embodiments, the optical system 100 satisfies a relational expression: 2.0<|f4/f1|+|f5/f6|<4.0; where f1 is an effective focal length of the first lens L1, f4 is the effective focal length of the fourth lens L4, f5 is an effective focal length of the fifth lens L5, and f6 is an effective focal length of the sixth lens L6. Specifically, |f4/f1|+|f5/f6| may be 3.11, 3.16, 3.19, 3.22, 3.27, 3.41, 3.45, 3.49, 3.53, or 3.58. When the above relational expression is satisfied, the refractive powers of the first lens L1, the fourth lens L4, the fifth lens L5, and the sixth lens L6 can be reasonably configured, so as to ensure that the positive and negative spherical aberrations of the optical system 100 can be balanced with each other, thereby improving the imaging quality of the optical system 100.

In some embodiments, the optical system 100 satisfies a relational expression: 1.0<f/f12<1.5; where f is a total effective focal length of the optical system 100, and f12 is a combined focal length of the first lens L1 and the second lens L2. Specifically, f/f12 may be 1.05, 1.06, 1.07, 1.09, 1.10, 1.12, 1.15, 1.16, 1.17, or 1.18. When the above relational expression is satisfied, the effective focal length of the optical system 100 and the combined focal length of the first lens L1 and the second lens L2 can be reasonably configured, so as to effectively shorten the total system length of the optical system 100 and avoid the excessive increase of high-order spherical aberration of the optical system 100, thereby improving the imaging quality of the optical system 100.

In some embodiments, the optical system 100 satisfies a relational expression: TT/ImgH<1.1; where TT is a distance from the object side surface S1 of the first lens L1 to the image side surface S12 of the sixth lens L6 on the optical axis, and ImgH is half of a diagonal length of an effective pixel area of the optical system 100 on an imaging plane. Specifically, TT/ImgH may be 1.05, 1.06, 1.07, or 1.08. When the above relational expression is satisfied, the imaging quality of the optical system 100 on the image plane S15 can be improved, and the total system length of the optical system 100 can be effectively shortened, which further satisfies the requirements of the miniaturization design of the lens.

In some embodiments, the optical system 100 satisfies a relational expression: −1.5<R9/R10<0; where R9 is a radius of curvature of the object side surface S9 of the fifth lens L5 at the optical axis, and R10 is a radius of curvature of the image side surface S10 of the fifth lens L5 at the optical axis. Specifically, R9/R10 may be −1.19, −1.15, −1.11, −1.09, −0.98, −0.92, −0.88, −0.82, −0.75, or −0.72. When the above relational expression is satisfied, the relation between the object side surface S9 and the image side surface S10 of the fifth lens L5 can be reasonably restricted, so that the deflection angle of the optical system 100 can be reasonably distributed, and the astigmatism of the off-axis field of view of the optical system 100 can be improved, thereby improving the imaging quality of the optical system 100.

In some embodiments, the optical system 100 satisfies a relational expression: 1<|f6|/R12<2; where f6 is the effective focal length of the sixth lens L6, and R12 is a radius of curvature of the image side surface S12 of the sixth lens L6 at the optical axis. Specifically, |f6|/R12 may be 1.82, 1.84, 1.85, 1.88, 1.89, 1.90, 1.92, 1.96, 1.97, or 1.98. When the above relational expression is satisfied, the effective focal length of the sixth lens L6 and the image side surface S12 can be reasonably configured, so as to reduce the incident angle of light rays reaching the image plane S15 of the optical system 100, so that the optical system 100 can be more easily matched with a photosensitive element.

In some embodiments, the optical system 100 satisfies a relational expression: 1.0<CT5/|SAG51|<5.0; where CT5 is a thickness of the fifth lens L5 on the optical axis, and SAG51 is a sagittal height of the object side surface S9 of the fifth lens L5, that is, a distance in a direction parallel to the optical axis from an intersection of the object side surface S9 of the fifth lens L5 on the optical axis to a maximum effective radius position of the object side surface S9 of the fifth lens L5. Specifically, CT5/|SAG51| may be 1.91, 2.13, 2.52, 2.68, 3.22, 3.34, 3.87, 3.92, 4.13, or 4.26. When the above relational expression is satisfied, the fifth lens L5 can be reasonably configured, so that the surface shape of the fifth lens L5 can be more reasonable, so as to reduce the defect rate of the fifth lens L5 during the processing and molding. In addition, the aberrations generated in the optical system 100 can be corrected, thereby further improving the imaging quality of the optical system 100.

According to the aforementioned descriptions of the various embodiments, more specific embodiments and accompanying drawings are provided below for detailed description.

First Embodiment

Figure 2:
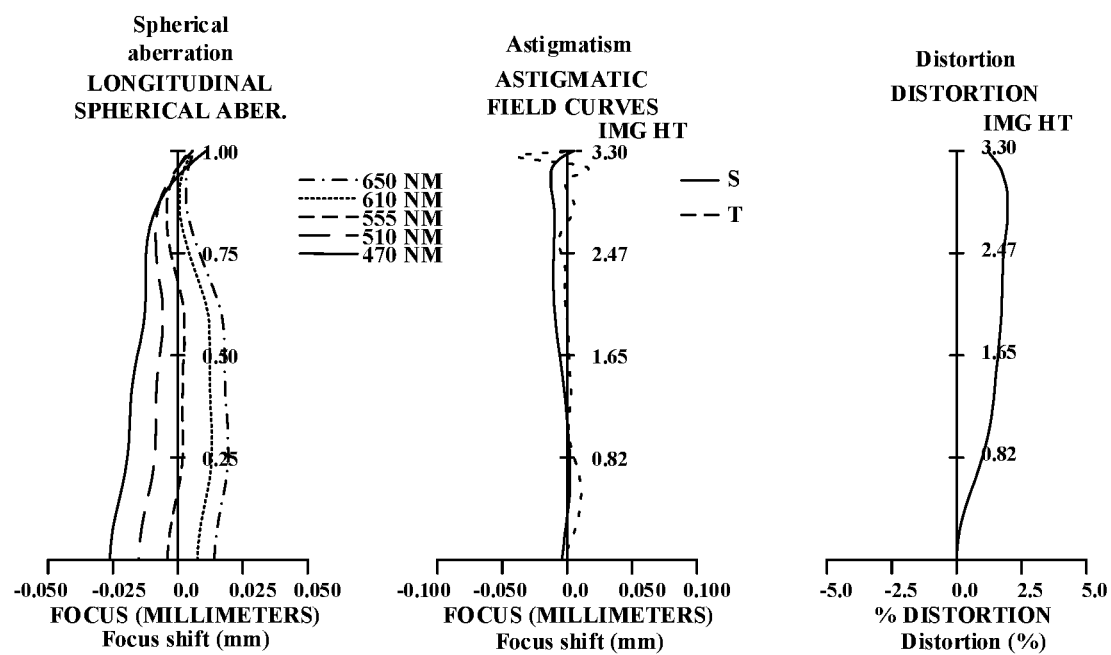
FIG. 2 is graphs of spherical aberration, astigmatism, and distortion of the optical system in the first embodiment of the present disclosure.

Referring to FIGS. 1 and 2, FIG. 1 is a schematic view of an optical system 100 in the first embodiment. The optical system 100 includes, sequentially arranged from an object side to an image side, an optical stop STO, a first lens L1 having a positive refractive power, a second lens L2 having a negative refractive power, a third lens L3 having a negative refractive power, a fourth lens L4 having a negative refractive power, a fifth lens L5 having a positive refractive power, and a sixth lens L6 having a negative refractive power. FIG. 2 is, sequentially from left to right, graphs of spherical aberration, astigmatism, and distortion of the optical system 100 in the first embodiment, where the graphs of astigmatism and distortion are both graphs at 555 nm, which are the same in other embodiments.

An object side surface S1 of the first lens L1 is convex at its paraxial position and convex at its circumference.

An image side surface S2 of the first lens L1 is planar at its paraxial position and planar at its circumference.

An object side surface S3 of the second lens L2 is planar at its paraxial position and planar at its circumference.

An image side surface S4 of the second lens L2 is concave at its paraxial position and convex at its circumference.

An object side surface S5 of the third lens L3 is concave at its paraxial position and concave at its circumference.

An image side surface S6 of the third lens L3 is convex at its paraxial position and concave at its circumference.

An object side surface S7 of the fourth lens L4 is concave at its paraxial position and concave at its circumference.

An image side surface S8 of the fourth lens L4 is concave at its paraxial position and convex at its circumference.

An object side surface S9 of the fifth lens L5 is convex at its paraxial position and concave at its circumference.

An image side surface S10 of the fifth lens L5 is convex at its paraxial position and convex at its circumference.

An object side surface S11 of the sixth lens L6 is convex at its paraxial position and convex at its circumference.

An image side surface S12 of the sixth lens L6 is concave at its paraxial position and concave at its circumference.

The image side surface S2 of the first lens L1 and the object side surface S3 of the second lens L2 are planar, while the object side surface S1 of the first lens L1, the image side surface S4 of the second lens L2, and the object side surfaces and the image side surfaces of the third lens L3, the fourth lens L4, the fifth lens L5, and the sixth lens L6 are all aspherical.

It should be noted that, in the present disclosure, when describing that a surface of a lens is convex at its paraxial position (a central area of this side surface), it can be understood as that an area of this surface of the lens near the optical axis is convex. When describing that a surface of a lens is concave at its circumference, it can be understood as that an area of this surface near the maximum effective radius is concave. For example, when this surface is convex at the optical axis and is also convex at its circumference, a shape of this surface in a direction from the center (the optical axis) to the edge may be completely convex, or the surface may be firstly transited from a convex shape at the center to a concave shape, and then become a convex surface at a position close to its maximum effective radius. These are only examples to illustrate the relation between the positions of the optical axis and the circumference. The various shapes and structures (concave-convex relationship) of the surface are not fully described, but other situations can be derived from the above examples.

The first lens L1, the second lens L2, the third lens L3, the fourth lens L4, the fifth lens L5, and the sixth lens L6 are all made of plastic.

Further, the optical system 100 satisfies a relational expression: CT1/SD11=1.001; where CT1 is a thickness of the first lens L1 on the optical axis, that is, a center thickness of the first lens L1, and SD11 is half of a maximum effective aperture of the object side surface S1 of the first lens L1. When the above relational expression is satisfied, the first lens L1 can be reasonably configured, so that the head of the camera lens is smaller, thereby satisfying the requirements of the miniaturization design of the electronic device.

The optical system 100 satisfies a relational expression: TTL/CT1=5.80; where CT1 is the thickness of the first lens L1 on the optical axis, and TTL is a distance from the object side surface S1 of the first lens L1 to the image plane S15. When the above relational expression is satisfied, the first lens L1 and a total system length of the optical system 100 can be reasonably configured, the total system length of the optical system 100 can be made smaller while ensuring that the head of the camera lens is small, which further satisfies the requirements of the miniaturization design of the electronic devices. In addition, it can also be ensured that the first lens L1 has a sufficient thickness, so that the yield rate of the first lens L1 during processing and molding is higher, and thus the yield rate of the assembly of the optical system 100 is further improved.

The optical system 100 satisfies a relational expression: FNO=2.54; where FNO is an f-number of the optical system 100. When the above relational expression is satisfied, while ensuring that the optical system 100 has a sufficient amount of light flux, it is also beneficial to make the head of the camera lens smaller.

The optical system 100 satisfies a relational expression: |f3/f4|=9.218; where f3 is an effective focal length of the third lens L3, and f4 is an effective focal length of the fourth lens L4. When the above relational expression is satisfied, the third lens L3 and the fourth lens L4 can be reasonably configured, so as to effectively expand the field of view of the optical system 100, thereby reducing the total system length of the optical system 100, and satisfying the requirements of the miniaturization design.

The optical system 100 satisfies a relational expression: |f4/f1|+|f5/f6|=3.58; where f1 is an effective focal length of the first lens L1, f4 is the effective focal length of the fourth lens L4, f5 is an effective focal length of the fifth lens L5, and f6 is an effective focal length of the sixth lens L6. When the above relational expression is satisfied, the refractive powers of the first lens L1, the fourth lens L4, the fifth lens L5, and the sixth lens L6 can be reasonably configured, so as to ensure that the positive and negative spherical aberrations of the optical system 100 can be balanced with each other, thereby improving the imaging quality of the optical system 100.

The optical system 100 satisfies a relational expression: f/f12=1.05; where f is a total effective focal length of the optical system 100, and f12 is a combined focal length of the first lens L1 and the second lens L2. When the above relational expression is satisfied, the effective focal length of the optical system 100 and the combined focal length of the first lens L1 and the second lens L2 can be reasonably configured, so as to effectively shorten the total system length of the optical system 100 and avoid the excessive increase of high-order spherical aberration of the optical system 100, thereby improving the imaging quality of the optical system 100.

The optical system 100 satisfies a relational expression: TT/ImgH=1.05; where TT is a distance from the object side surface S1 of the first lens L1 to the image side surface S12 of the sixth lens L6 on the optical axis, and ImgH is half of a diagonal length of an effective pixel area of the optical system 100 on the imaging plane. When the above relational expression is satisfied, the imaging quality of the optical system 100 on the image plane S15 can be improved, and the total system length of the optical system 100 can be effectively shortened, which further satisfies the requirements of the miniaturization design of the lens.

The optical system 100 satisfies a relational expression: R9/R10=−1.19; where R9 is a radius of curvature of the object side surface S9 of the fifth lens L5 at the optical axis, and R10 is a radius of curvature of the image side surface S10 of the fifth lens L5 at the optical axis. When the above relational expression is satisfied, the relation between the object side surface S9 and the image side surface S10 of the fifth lens L5 can be reasonably restricted, so that the deflection angle of the optical system 100 can be reasonably distributed, and the astigmatism of the off-axis field of view of the optical system 100 can be improved, thereby improving the imaging quality of the optical system 100.

The optical system 100 satisfies a relational expression: |f6|/R12=1.83; where f6 is the effective focal length of the sixth lens L6, and R12 is a radius of curvature of the image side surface S12 of the sixth lens L6 at the optical axis. When the above relational expression is satisfied, the effective focal length of the sixth lens L6 and the image side surface S12 can be reasonably configured, so as to reduce the incident angle of light rays reaching the image plane S15 of the optical system 100, so that the optical system 100 can be more easily matched with a photosensitive element.

The optical system 100 satisfies a relational expression: CT5/|SAG51|=3.70; where CT5 is a thickness of the fifth lens L5 on the optical axis, and SAG51 is a sagittal height of the object side surface S9 of the fifth lens L5. When the above relational expression is satisfied, the fifth lens L5 can be reasonably configured, so that the surface shape of the fifth lens L5 can be more reasonable, so as to reduce the defect rate of the fifth lens L5 during the processing and molding. In addition, the aberrations generated in the optical system 100 can be corrected, thereby further improving the imaging quality of the optical system 100.

In addition, various parameters of the optical system 100 are given in Table 1. The image plane S15 in Table 1 can be understood as an imaging plane of the optical system 100. The elements from an object plane (not shown in the figures) to the image plane S15 are sequentially arranged in the order of the elements from top to bottom in Table 1. The Y radius in Table 1 is a radius of curvature of an object side surface or an image side surface with a corresponding surface number on the optical axis. The surface numbers 1 and 2 are the object side surface S1 and the image side surface S2 of the first lens L1, respectively. That is, in the same lens, a surface with a smaller surface number is an object side surface, and a surface with a larger surface number is an image side surface. The first value in the "thickness" parameter column of the first lens L1 is a thickness of the lens on the optical axis, and the second value therein is a distance on the optical axis from the image side surface of the lens to an object side surface of a rear lens in a direction towards the image side.

It should be noted that in this embodiment and the following various embodiments, the optical system 100 may not be provided with the infrared filter L7, but in this case, a distance from the image side surface S11 of the sixth lens L6 to the image plane S15 remains unchanged.

In the first embodiment, the total effective focal length of the optical system 100 is indicated by f, and f=3.68 mm. The f-number thereof is indicated by FNO, and FNO=2.54. The half of the maximum field of view is indicated by HFOV, and HFOV=41.06°. The distance from the object side surface S1 of the first lens L1 to the image plane S15 on the optical axis is indicated by TTL, and TTL=4.4 mm.

In addition, the focal length, refractive index, and Abbe number of each of the lenses are values at a wavelength of 555 nm, and the same applies to other embodiments.

TABLE 1

First Embodiment
f = 3.68 mm, FNO = 2.54, HFOV = 41.06°, TTL = 4.4 mm

| Surface number | Surface name | Surface shape | Y radius (mm) | Thickness (mm) | Material | Refractive index | Abbe number | Focal length (mm) |
|---|---|---|---|---|---|---|---|---|
| | Object plane | Spherical | Infinite | 394 | | | | |
| | Optical stop | Spherical | Infinite | −0.129 | | | | |
| 1 | First lens | Aspherical | 1.613 | 0.759 | Plastic | 1.546 | 56.14 | 2.95 |
| 2 | | Aspherical | Infinite | 0.050 | | | | |
| 3 | Second lens | Aspherical | Infinite | 0.250 | Plastic | 1.546 | 56.14 | −14.50 |
| 4 | | Aspherical | 7.915 | 0.093 | | | | |
| 5 | Third lens | Aspherical | −20.750 | 0.280 | Plastic | 1.666 | 20.37 | −64.25 |
| 6 | | Aspherical | −40.475 | 0.238 | | | | |
| 7 | Fourth lens | Aspherical | −79.355 | 0.290 | Plastic | 1.645 | 23.54 | −6.97 |
| 8 | | Aspherical | 4.767 | 0.192 | | | | |
| 9 | Fifth lens | Aspherical | 3.200 | 0.666 | Plastic | 1.546 | 56.14 | 2.79 |
| 10 | | Aspherical | −2.685 | 0.328 | | | | |
| 11 | Sixth lens | Aspherical | 563.270 | 0.326 | Plastic | 1.546 | 56.14 | −2.29 |
| 12 | | Aspherical | 1.249 | 0.310 | | | | |
| 13 | Infrared filter | Spherical | Infinite | 0.210 | Glass | 1.518 | 64.17 | |
| 14 | | Spherical | Infinite | 0.408 | | | | |
| 15 | Image plane | Spherical | Infinite | 0.000 | | | | |

Further, the aspheric coefficients of the image side surfaces or the object side surfaces of the lenses of the optical system 100 are given in Table 2. The surface numbers from 1-10 represent the image side surfaces or the object side surfaces S1-S10, respectively. The K to A20 from top to bottom represent the types of the aspheric coefficients, respectively, where K represents a conic coefficient, A4 represents a fourth-order aspheric coefficient, A6 represents a sixth-order aspheric coefficient, and A8 is an eighth-order aspheric coefficient, and so on. In addition, the aspheric coefficient equation is as follows:

$$Z = \frac{cr^2}{1 + \sqrt{1-(k+1)c^2r^2}} + \sum_i Ai\, r^i$$

where, Z is a distance from a corresponding point on the aspherical surface to a plane tangent to a vertex of the surface, r is a distance from a corresponding point on the aspherical surface to the optical axis, c is a curvature of the vertex of the aspherical surface, k is a conic coefficient, and Ai is a coefficient corresponding to a high-order term of the $i^{th}$ term in the equation of the aspherical surface shape.

TABLE 2

First Embodiment
Aspheric coefficient

| Surface number | 1 | 2 | 3 | 4 | 5 | 6 |
|---|---|---|---|---|---|---|
| K   | −4.6198E+00 | 1.0000E+00  | 1.0000E+00  | −5.0000E+01 | 3.0000E+01  | −5.0000E+01 |
| A4  | 1.1936E−01  | 3.6869E−02  | 3.2258E−02  | −1.1334E−01 | −4.2808E−02 | 1.0970E−01  |
| A6  | −3.0613E−03 | −5.1250E−01 | −1.9135E−01 | −1.4635E−01 | −4.1251E−01 | −2.6859E−01 |
| A8  | −5.0869E−01 | 4.5843E+00  | 8.1092E−02  | −2.1782E+00 | −3.6638E−01 | 6.1508E−01  |
| A10 | 2.2954E+00  | −2.4375E+01 | 8.2420E+00  | 1.5945E+01  | 7.6378E+00  | −4.5595E−01 |
| A12 | −5.3919E+00 | 7.5584E+01  | −6.1183E+01 | −5.7803E+01 | −2.9619E+01 | 1.7876E−01  |
| A14 | 6.5558E+00  | −1.4024E+02 | 1.9924E+02  | 1.1705E+02  | 6.1589E+01  | −4.2137E−02 |
| A16 | −3.2594E+00 | 1.5505E+02  | −3.3615E+02 | −1.2117E+02 | −6.4964E+01 | 0.0000E+00  |
| A18 | 0.0000E+00  | −9.4868E+01 | 2.8764E+02  | 4.9545E+01  | 2.6770E+01  | 0.0000E+00  |
| A20 | 0.0000E+00  | 2.4857E+01  | −9.8988E+01 | 0.0000E+00  | 0.0000E+00  | 0.0000E+00  |

| Surface number | 7 | 8 | 9 | 10 | 11 | 12 |
|---|---|---|---|---|---|---|
| K   | 5.0000E+01  | −1.9990E+01 | −1.1302E+01 | −3.7576E+01 | −1.5017E+01 | −7.9842E+00 |
| A4  | −1.2951E−01 | −2.4089E−01 | −6.4338E−03 | 1.1234E−02  | −3.9618E−01 | −2.2194E−01 |
| A6  | 4.8684E−01  | 2.6803E−01  | −2.3170E−01 | −4.2480E−02 | 2.1950E−01  | 1.7054E−01  |
| A8  | −2.2834E+00 | −2.7059E−01 | 5.2030E−01  | 4.7069E−02  | −3.3018E−02 | −9.9184E−02 |
| A10 | 7.8221E+00  | 2.4577E−01  | −7.4016E−01 | −9.0827E−03 | −7.2916E−03 | 4.2828E−02  |
| A12 | −1.7576E+01 | −7.8124E−02 | 6.7761E−01  | −1.5733E−02 | 2.5762E−03  | −1.3315E−02 |
| A14 | 2.5309E+01  | −1.2314E−01 | −3.9778E−01 | 1.1829E−02  | 8.0434E−05  | 2.7878E−03  |
| A16 | −2.2717E+01 | 1.4792E−01  | 1.4105E−01  | −3.5652E−03 | −1.2311E−04 | −3.6474E−04 |
| A18 | 1.1575E+01  | −6.2327E−02 | −2.6970E−02 | 5.0866E−04  | 1.8116E−05  | 2.6738E−05  |
| A20 | −2.5654E+00 | 9.5591E−03  | 2.1132E−03  | −2.8226E−05 | −8.7338E−07 | −8.3712E−07 |

Second Embodiment

Figure 3:
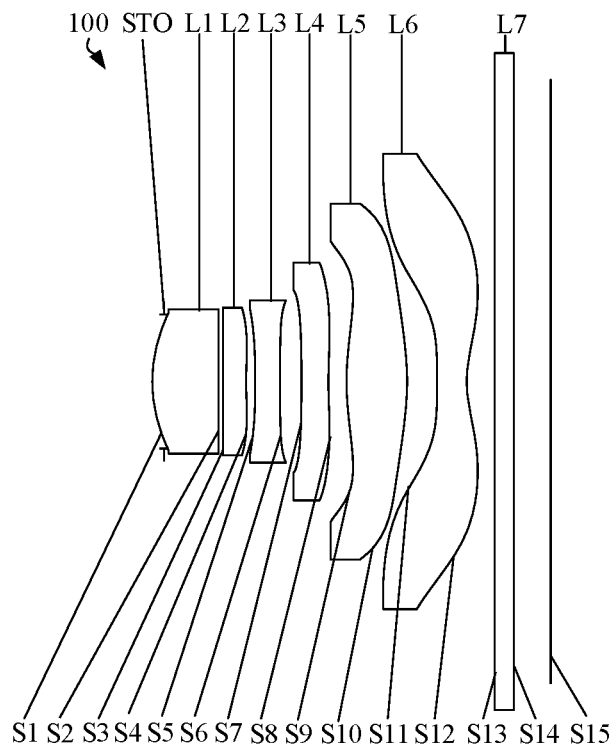
FIG. 3 is a schematic view of an optical system in a second embodiment of the present disclosure.
Figure 4:
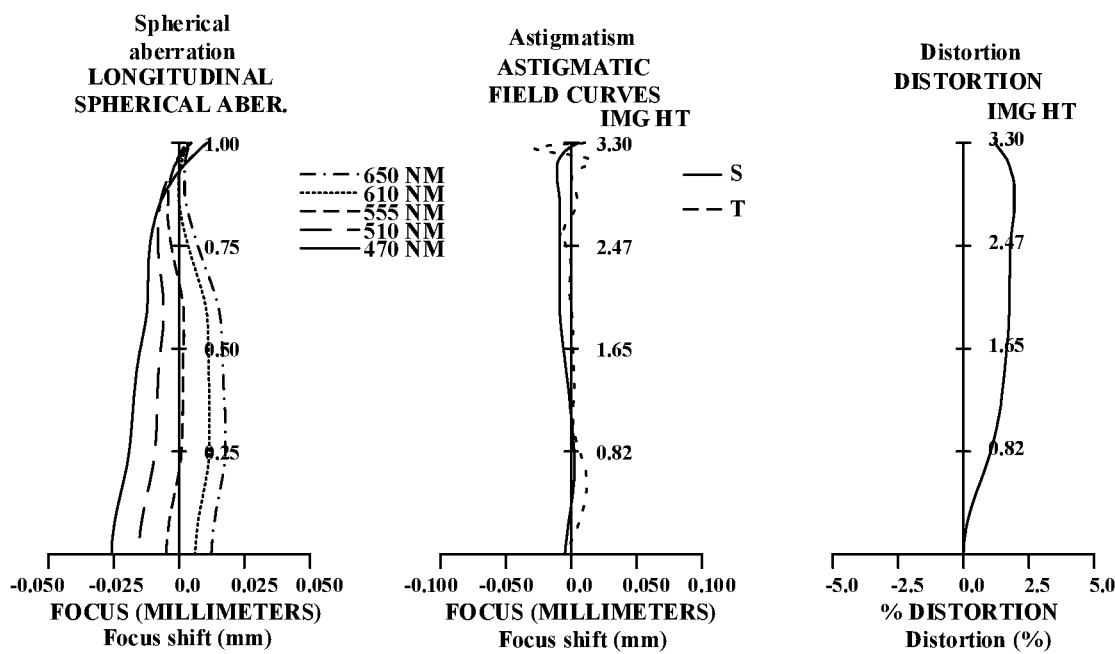
FIG. 4 is graphs of spherical aberration, astigmatism, and distortion of the optical system in the second embodiment of the present disclosure.

Referring to FIGS. 3 and 4, FIG. 3 is a schematic view of an optical system 100 in the second embodiment. The optical system 100 includes, sequentially arranged from an object side to an image side, an optical stop STO, a first lens L1 having a positive refractive power, a second lens L2 having a negative refractive power, a third lens L3 having a negative refractive power, a fourth lens L4 having a negative refractive power, a fifth lens L5 having a positive refractive power, and a sixth lens L6 having a negative refractive power. FIG. 4 is, sequentially from left to right, graphs of spherical aberration, astigmatism, and distortion of the optical system 100 in the second embodiment.

An object side surface S1 of the first lens L1 is convex at its paraxial position and convex at its circumference.

An image side surface S2 of the first lens L1 is planar at its paraxial position and planar at its circumference.

An object side surface S3 of the second lens L2 is planar at its paraxial position and planar at its circumference.

An image side surface S4 of the second lens L2 is concave at its paraxial position and convex at its circumference.

An object side surface S5 of the third lens L3 is concave at its paraxial position and concave at its circumference.

An image side surface S6 of the third lens L3 is convex at its paraxial position and concave at its circumference.

An object side surface S7 of the fourth lens L4 is concave at its paraxial position and concave at its circumference.

An image side surface S8 of the fourth lens L4 is concave at its paraxial position and convex at its circumference.

An object side surface S9 of the fifth lens L5 is convex at its paraxial position and concave at its circumference.

An image side surface S10 of the fifth lens L5 is convex at its paraxial position and convex at its circumference.

An object side surface S11 of the sixth lens L6 is convex at its paraxial position and convex at its circumference.

An image side surface S12 of the sixth lens L6 is concave at its paraxial position and concave at its circumference.

The image side surface S2 of the first lens L1 and the object side surface S3 of the second lens L2 are planar, while the object side surface S1 of the first lens L1, the image side surface S4 of the second lens L2, and the object side surfaces and the image side surfaces of the third lens L3, the fourth lens L4, the fifth lens L5, and the sixth lens L6 are all aspherical.

The first lens L1, the second lens L2, the third lens L3, the fourth lens L4, the fifth lens L5, and the sixth lens L6 are all made of plastic.

In addition, various parameters of the optical system 100 are given in Table 3, in which definitions of the various parameters can be obtained from the first embodiment, which will not be repeated here.

TABLE 3

Second embodiment
f = 3.67 mm, FNO = 2.55, HFOV = 41.13°, TTL = 4.4 mm

| Surface number | Surface name | Surface shape | Y radius (mm) | Thickness (mm) | Material | Refractive index | Abbe number | Focal length (mm) |
|---|---|---|---|---|---|---|---|---|
| | Object plane | Spherical | Infinite | 394 | | | | |
| | Optical stop | Spherical | Infinite | −0.130 | | | | |
| 1 | First lens | Aspherical | 1.616 | 0.730 | Plastic | 1.546 | 56.14 | 2.96 |
| 2 | | Aspherical | Infinite | 0.050 | | | | |
| 3 | Second lens | Aspherical | Infinite | 0.258 | Plastic | 1.546 | 56.14 | −15.78 |
| 4 | | Aspherical | 8.616 | 0.097 | | | | |
| 5 | Third lens | Aspherical | −19.615 | 0.277 | Plastic | 1.666 | 20.37 | −45.80 |
| 6 | | Aspherical | −55.183 | 0.235 | | | | |
| 7 | Fourth lens | Aspherical | −70.507 | 0.298 | Plastic | 1.645 | 23.54 | −7.01 |
| 8 | | Aspherical | 4.829 | 0.200 | | | | |
| 9 | Fifth lens | Aspherical | 3.134 | 0.669 | Plastic | 1.546 | 56.14 | 2.78 |
| 10 | | Aspherical | −2.727 | 0.330 | | | | |
| 11 | Sixth lens | Aspherical | −386.669 | 0.329 | Plastic | 1.546 | 56.14 | −2.31 |
| 12 | | Aspherical | 1.267 | 0.309 | | | | |
| 13 | Infrared filter | Spherical | Infinite | 0.210 | Glass | 1.518 | 64.17 | |
| 14 | | Spherical | Infinite | 0.408 | | | | |
| 15 | Image plane | Spherical | Infinite | 0.000 | | | | |

Further, the aspheric coefficients of the image side surfaces or the object side surfaces of the lenses of the optical system 100 are given in Table 4, in which definitions of the various parameters can be obtained from the first embodiment, which will not be repeated here.

TABLE 4

Second embodiment
Aspheric coefficient

| Surface number | 1 | 2 | 3 | 4 | 5 | 6 |
|---|---|---|---|---|---|---|
| K | −4.6557E+00 | 1.0000E+00 | 1.0000E+00 | −5.0000E+01 | 3.0000E+01 | −4.9699E+01 |
| A4 | 1.2012E−01 | 3.8097E−02 | 3.9654E−02 | −1.1368E−01 | −4.3566E−02 | 1.1775E−01 |
| A6 | −2.6116E−02 | −5.6242E−01 | −2.8926E−01 | −1.6104E−01 | −3.8656E−01 | −3.1703E−01 |
| A8 | −3.2888E−01 | 4.8517E+00 | 6.9985E−01 | −2.2456E+00 | −7.8303E−01 | 7.5239E−01 |
| A10 | 1.5175E+00 | −2.4286E+01 | 6.6102E+00 | 1.7124E+01 | 1.0082E+01 | −6.7550E−01 |
| A12 | −3.6040E+00 | 7.0582E+01 | −5.9958E+01 | −6.2229E+01 | −3.6572E+01 | 3.6620E−01 |
| A14 | 4.4609E+00 | −1.2292E+02 | 2.0067E+02 | 1.2415E+02 | 7.1858E+01 | −1.0665E−01 |
| A16 | −2.2763E+00 | 1.2797E+02 | −3.3772E+02 | −1.2619E+02 | −7.2476E+01 | 0.0000E+00 |
| A18 | 0.0000E+00 | −7.4022E+01 | 2.8608E+02 | 5.0733E+01 | 2.8899E+01 | 0.0000E+00 |
| A20 | 0.0000E+00 | 1.8398E+01 | −9.7289E+01 | 0.0000E+00 | 0.0000E+00 | 0.0000E+00 |

| Surface number | 7 | 8 | 9 | 10 | 11 | 12 |
|---|---|---|---|---|---|---|
| K | 4.4680E+01 | −2.3977E+01 | −1.1446E+01 | −3.6906E+01 | 5.0000E+01 | −7.8769E+00 |
| A4 | −1.2432E−01 | −2.3698E−01 | −7.0824E−03 | 1.2871E−02 | −3.9234E−01 | −2.2200E−01 |
| A6 | 4.4185E−01 | 2.4676E−01 | −2.2265E−01 | −4.3614E−02 | 2.2629E−01 | 1.7336E−01 |
| A8 | −2.1163E+00 | −2.0733E−01 | 4.9204E−01 | 4.0326E−02 | −4.9531E−02 | −1.0215E−01 |
| A10 | 7.4087E+00 | 1.2121E−01 | −6.8969E−01 | 3.3138E−03 | 5.6263E−03 | 4.4453E−02 |
| A12 | −1.6945E+01 | 7.1279E−02 | 6.2461E−01 | −2.5388E−02 | −2.7552E−03 | −1.3886E−02 |
| A14 | 2.4792E+01 | −2.3127E−01 | −3.6449E−01 | 1.5974E−02 | 1.3729E−03 | 2.9207E−03 |
| A16 | −2.2593E+01 | 1.9471E−01 | 1.2892E−01 | −4.5889E−03 | −3.0871E−04 | −3.8438E−04 |
| A18 | 1.1682E+01 | −7.3586E−02 | −2.4642E−02 | 6.4549E−04 | 3.2790E−05 | 2.8371E−05 |

In addition, according to the parameter information provided above, the following relations can be derived:

$CT1/SD11=0.967$; $TTL/CT1=6.03$; $FNO=2.55$; $|f3/f4|=6.534$;

$|f4/f1|+|f5/f6|=3.57$; $f/f12=1.06$; $TT/ImgH=1.05$; $R9/R10=-1.15$;

$|f6|/R12=1.82$; $CT5/|SAG51|=3.78$.

Third Embodiment

Figure 5:
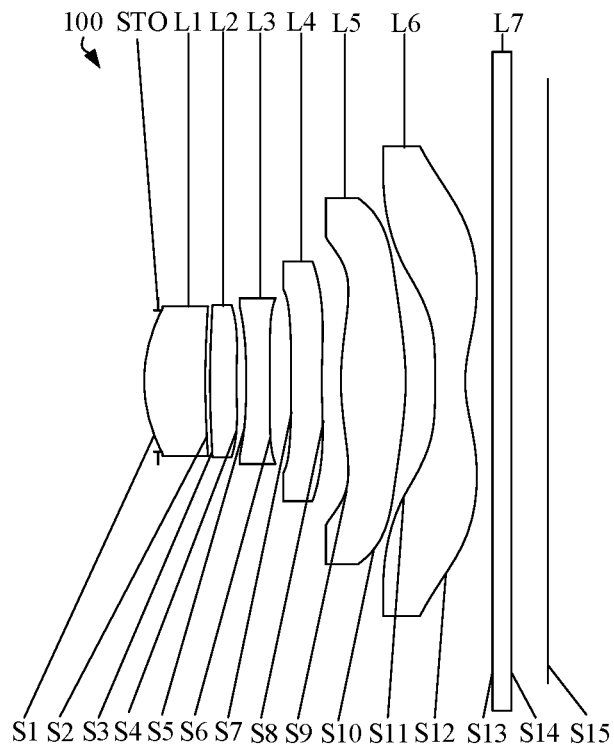
FIG. 5 is a schematic view of an optical system in a third embodiment of the present disclosure.
Figure 6:
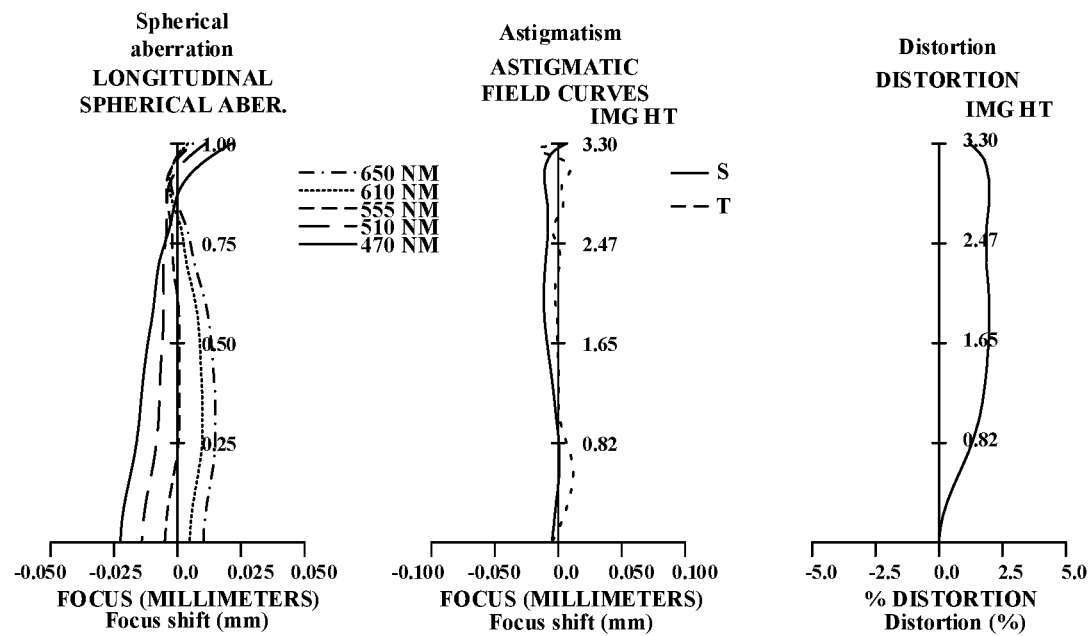
FIG. 6 is graphs of spherical aberration, astigmatism, and distortion of the optical system in the third embodiment of the present disclosure.

Referring to FIGS. 5 and 6, FIG. 5 is a schematic view of an optical system 100 in the third embodiment. The optical system 100 includes, sequentially arranged from an object side to an image side, an optical stop STO, a first lens L1 having a positive refractive power, a second lens L2 having a negative refractive power, a third lens L3 having a negative refractive power, a fourth lens L4 having a negative refractive power, a fifth lens L5 having a positive refractive power, and a sixth lens L6 having a negative refractive power. FIG. 6 is, sequentially from left to right, graphs of spherical aberration, astigmatism, and distortion of the optical system 100 in the third embodiment.

An object side surface S1 of the first lens L1 is convex at its paraxial position and convex at its circumference.

An image side surface S2 of the first lens L1 is concave at its paraxial position and concave at its circumference.

An object side surface S3 of the second lens L2 is convex at its paraxial position and convex at its circumference.

An image side surface S4 of the second lens L2 is concave at its paraxial position and convex at its circumference.

An object side surface S5 of the third lens L3 is concave at its paraxial position and concave at its circumference.

An image side surface S6 of the third lens L3 is convex at its paraxial position and concave at its circumference.

An object side surface S7 of the fourth lens L4 is concave at its paraxial position and concave at its circumference.

An image side surface S8 of the fourth lens L4 is concave at its paraxial position and convex at its circumference.

An object side surface S9 of the fifth lens L5 is convex at its paraxial position and concave at its circumference.

An image side surface S10 of the fifth lens L5 is convex at its paraxial position and convex at its circumference.

An object side surface S11 of the sixth lens L6 is convex at its paraxial position and convex at its circumference.

An image side surface S12 of the sixth lens L6 is concave at its paraxial position and concave at its circumference.

The object side surfaces and the image side surfaces of the first lens L1, the second lens L2, the third lens L3, the fourth lens L4, the fifth lens L5, and the sixth lens L6 are all aspherical.

The first lens L1, the second lens L2, the third lens L3, the fourth lens L4, the fifth lens L5, and the sixth lens L6 are all made of plastic.

In addition, various parameters of the optical system 100 are given in Table 5, in which definitions of the various parameters can be obtained from the first embodiment, which will not be repeated here.

TABLE 5

Third Embodiment
f = 3.66 mm, FNO = 2.41, HFOV = 41.21°, TTL = 4.445 mm

| Surface number | Surface name | Surface shape | Y radius (mm) | Thickness (mm) | Material | Refractive index | Abbe number | Focal length (mm) |
|---|---|---|---|---|---|---|---|---|
| | Object plane | Spherical | Infinite | 400 | | | | |
| | Optical stop | Spherical | Infinite | −0.153 | | | | |
| 1 | First lens | Aspherical | 1.592 | 0.673 | Plastic | 1.546 | 56.14 | 3.36 |
| 2 | | Aspherical | 10.272 | 0.052 | | | | |
| 3 | Second lens | Aspherical | 10.888 | 0.294 | Plastic | 1.546 | 56.14 | −177.22 |
| 4 | | Aspherical | 9.693 | 0.105 | | | | |
| 5 | Third lens | Aspherical | −11.954 | 0.262 | Plastic | 1.666 | 20.37 | −26.01 |
| 6 | | Aspherical | −38.826 | 0.235 | | | | |
| 7 | Fourth lens | Aspherical | −71.823 | 0.335 | Plastic | 1.645 | 23.54 | −7.05 |
| 8 | | Aspherical | 4.854 | 0.212 | | | | |
| 9 | Fifth lens | Aspherical | 2.924 | 0.714 | Plastic | 1.546 | 56.14 | 2.80 |
| 10 | | Aspherical | −2.922 | 0.322 | | | | |
| 11 | Sixth lens | Aspherical | 112.513 | 0.332 | Plastic | 1.546 | 56.14 | −2.43 |
| 12 | | Aspherical | 1.307 | 0.301 | | | | |
| 13 | Infrared | Spherical | Infinite | 0.210 | Glass | 1.518 | 64.17 | |
| 14 | filter | Spherical | Infinite | 0.399 | | | | |
| 15 | Image plane | Spherical | Infinite | 0.000 | | | | |

Further, the aspheric coefficients of the image side surfaces or the object side surfaces of the lenses of the optical system 100 are given in Table 6, in which definitions of the various parameters can be obtained from the first embodiment, which will not be repeated here.

TABLE 6

Third Embodiment
Aspheric coefficient

| Surface number | 1 | 2 | 3 | 4 | 5 | 6 |
|---|---|---|---|---|---|---|
| K | −4.4978E+00 | −3.4503E+01 | −1.7992E+01 | −5.0000E+01 | 2.4038E+01 | 3.0000E+01 |
| A4 | 1.2371E−01 | 3.9205E−02 | 3.7243E−02 | −1.0998E−01 | −3.2525E−02 | 1.1624E−01 |
| A6 | −3.2929E−02 | −5.0760E−01 | −3.4734E−01 | −1.6074E−01 | −4.4954E−01 | −3.1284E−01 |
| A8 | −1.6451E−01 | 3.2833E+00 | 6.6264E−01 | −2.0223E+00 | −1.7538E−01 | 7.1762E−01 |
| A10 | 6.4984E−01 | −1.2062E+01 | 6.7989E+00 | 1.4063E+01 | 5.6424E+00 | −6.1903E−01 |
| A12 | −1.3752E+00 | 2.6615E+01 | −4.7885E+01 | −4.5003E+01 | −1.9002E+01 | 3.0820E−01 |
| A14 | 1.5923E+00 | −3.7705E+01 | 1.3409E+02 | 7.9591E+01 | 3.4661E+01 | −8.0246E−02 |
| A16 | −7.8640E−01 | 3.5321E+01 | −1.9561E+02 | −7.2771E+01 | −3.2986E+01 | 0.0000E+00 |
| A18 | 0.0000E+00 | −2.0334E+01 | 1.4749E+02 | 2.6641E+01 | 1.2447E+01 | 0.0000E+00 |
| A20 | 0.0000E+00 | 5.3735E+00 | −4.5559E+01 | 0.0000E+00 | 0.0000E+00 | 0.0000E+00 |

| Surface number | 7 | 8 | 9 | 10 | 11 | 12 |
|---|---|---|---|---|---|---|
| K | 5.0000E+01 | −3.2271E+01 | −1.0343E+01 | −3.7734E+01 | −4.0000E+01 | −7.2234E+00 |
| A4 | −1.1661E−01 | −2.1245E−01 | −8.1680E−03 | 2.1417E−01 | −3.5847E−01 | −2.0972E−01 |
| A6 | 3.5650E−01 | 1.3812E−01 | −2.1740E−01 | −6.1260E−02 | 1.8475E−01 | 1.5782E−01 |
| A8 | −1.7225E+00 | 1.4935E−01 | 4.9639E−01 | 6.1822E−02 | −2.1902E−02 | −8.9237E−02 |
| A10 | 6.6102E+00 | −5.9366E−01 | −6.9442E−01 | −1.6543E−02 | −8.2219E−03 | 3.7445E−02 |
| A12 | −1.6691E+01 | 9.1414E−01 | 6.1770E−01 | −1.1820E−02 | 2.5530E−03 | −1.1354E−02 |
| A14 | 2.6529E+01 | −8.3435E−01 | −3.5274E−01 | 1.0028E−02 | −3.5306E−05 | 2.3301E−03 |
| A16 | −2.5781E+01 | 4.5479E−01 | 1.2244E−01 | −3.0550E−03 | −7.4560E−05 | −3.0019E−04 |
| A18 | 1.3990E+01 | −1.3556E−01 | −2.3083E−02 | 4.3515E−04 | 1.1111E−05 | 2.1739E−05 |
| A20 | −3.2543E+00 | 1.6935E−02 | 1.7951E−03 | −2.4154E−05 | −5.1714E−07 | −6.7383E−07 |

In addition, according to the parameter information provided above, the following relations can be derived:

CT1/SD11=0.85; TTL/CT1=6.60; FNO=2.41; |f3/f4|=3.689;

|f4/f1|+|f5/f6|=3.25; f/f12=1.08; TT/ImgH=1.07; R9/R10=−1.00;

|f6|/R12=1.86; CT5/|SAG51|=4.3.

Fourth Embodiment

Figure 7:
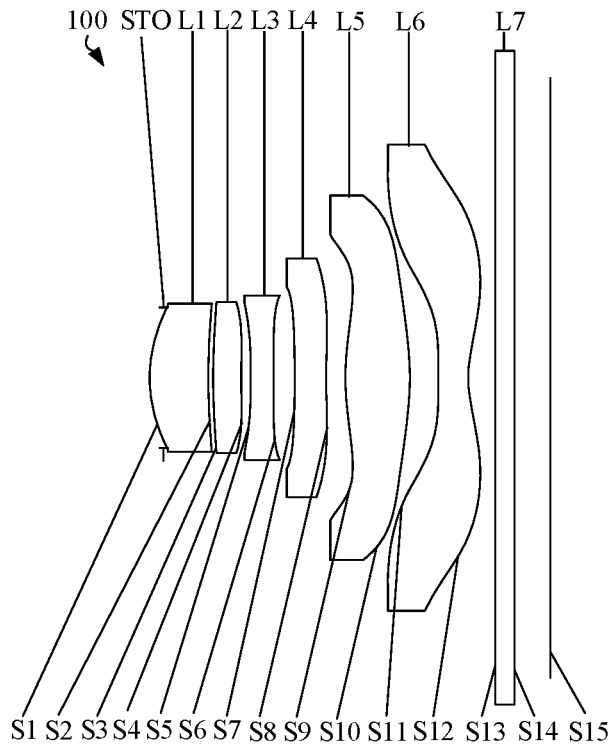
FIG. 7 is a schematic view of an optical system in a fourth embodiment of the present disclosure.
Figure 8:
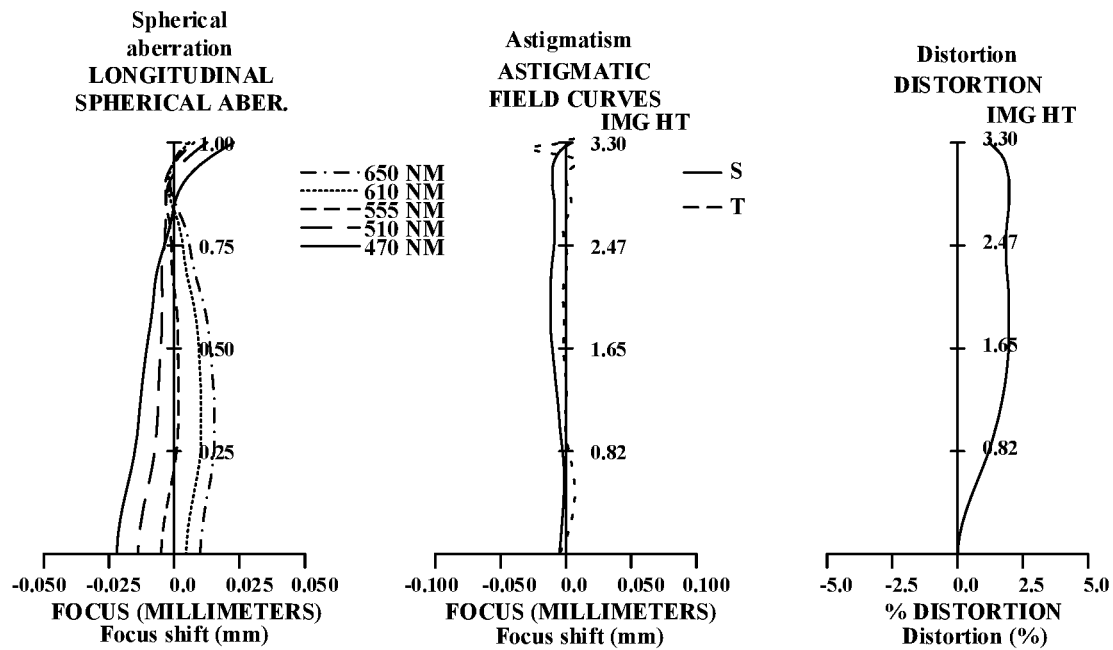
FIG. 8 is graphs of spherical aberration, astigmatism, and distortion of the optical system in the fourth embodiment of the present disclosure.

Referring to FIGS. 7 and 8, FIG. 7 is a schematic view of an optical system 100 in the fourth embodiment. The optical system 100 includes, sequentially arranged from an object side to an image side, an optical stop STO, a first lens L1 having a positive refractive power, a second lens L2 having a positive refractive power, a third lens L3 having a negative refractive power, a fourth lens L4 having a negative refractive power, a fifth lens L5 having a positive refractive power, and a sixth lens L6 having a negative refractive power. FIG. 8 is, sequentially from left to right, graphs of spherical aberration, astigmatism, and distortion of the optical system 100 in the fourth embodiment.

An object side surface S1 of the first lens L1 is convex at its paraxial position and convex at its circumference.

An image side surface S2 of the first lens L1 is concave at its paraxial position and concave at its circumference.

An object side surface S3 of the second lens L2 is convex at its paraxial position and convex at its circumference.

An image side surface S4 of the second lens L2 is concave at its paraxial position and convex at its circumference.

An object side surface S5 of the third lens L3 is concave at its paraxial position and concave at its circumference.

An image side surface S6 of the third lens L3 is convex at its paraxial position and concave at its circumference.

An object side surface S7 of the fourth lens L4 is concave at its paraxial position and concave at its circumference.

An image side surface S8 of the fourth lens L4 is concave at its paraxial position and convex at its circumference.

An object side surface S9 of the fifth lens L5 is convex at its paraxial position and concave at its circumference.

An image side surface S10 of the fifth lens L5 is convex at its paraxial position and convex at its circumference.

An object side surface S11 of the sixth lens L6 is convex at its paraxial position and convex at its circumference.

An image side surface S12 of the sixth lens L6 is concave at its paraxial position and concave at its circumference.

The object side surfaces and the image side surfaces of the first lens L1, the second lens L2, the third lens L3, the fourth lens L4, the fifth lens L5, and the sixth lens L6 are all aspherical.

The first lens L1, the second lens L2, the third lens L3, the fourth lens L4, the fifth lens L5, and the sixth lens L6 are all made of plastic.

In addition, various parameters of the optical system 100 are given in Table 7, in which definitions of the various parameters can be obtained from the first embodiment, which will not be repeated here.

TABLE 7

Fourth Embodiment
f = 3.67 mm, FNO = 2.41, HFOV = 40.15°, TTL = 4.45 mm

| Surface number | Surface name | Surface shape | Y radius (mm) | Thickness (mm) | Material | Refractive index | Abbe number | Focal length (mm) |
|---|---|---|---|---|---|---|---|---|
|  | Object plane | Spherical | Infinite | 400 |  |  |  |  |
|  | Optical stop | Spherical | Infinite | −0.154 |  |  |  |  |
| 1 |  | Aspherical | 1.589 | 0.651 | Plastic | 1.546 | 56.14 | 3.52 |
| 2 | First lens | Aspherical | 7.825 | 0.054 |  |  |  |  |
| 3 |  | Aspherical | 7.978 | 0.312 | Plastic | 1.546 | 56.14 | 76.58 |
| 4 | Second lens | Aspherical | 9.723 | 0.106 |  |  |  |  |
| 5 |  | Aspherical | −13.031 | 0.253 | Plastic | 1.666 | 20.37 | −22.82 |
| 6 | Third lens | Aspherical | −91.639 | 0.234 |  |  |  |  |
| 7 |  | Aspherical | −61.080 | 0.349 | Plastic | 1.645 | 23.54 | −7.25 |
| 8 | Fourth lens | Aspherical | 5.064 | 0.216 |  |  |  |  |
| 9 |  | Aspherical | 2.933 | 0.716 | Plastic | 1.546 | 56.14 | 2.81 |
| 10 | Fifth lens | Aspherical | −2.934 | 0.315 |  |  |  |  |
| 11 |  | Aspherical | 71.850 | 0.332 | Plastic | 1.546 | 56.14 | −2.43 |
| 12 | Sixth lens | Aspherical | 1.299 | 0.303 |  |  |  |  |
| 13 | Infrared | Spherical | Infinite | 0.210 | Glass | 1.518 | 64.17 |  |
| 14 | filter | Spherical | Infinite | 0.401 |  |  |  |  |
| 15 | Image plane | Spherical | Infinite | 0.000 |  |  |  |  |

Further, the aspheric coefficients of the image side surfaces or the object side surfaces of the lenses of the optical system 100 are given in Table 8, in which definitions of the various parameters can be obtained from the first embodiment, which will not be repeated here.

TABLE 8

Fourth Embodiment
Aspheric coefficient

| Surface number | 1 | 2 | 3 | 4 | 5 | 6 |
|---|---|---|---|---|---|---|
| K | −4.4829E+00 | −3.1772E+01 | −2.3952E+01 | −5.0000E+01 | 2.1901E+01 | 4.0000E+01 |
| A4 | 1.2345E−01 | 3.4012E−02 | 2.8057E−02 | −1.1154E−01 | −2.9557E−02 | 1.1583E−01 |
| A6 | −2.1596E−02 | −4.3858E−01 | −2.8258E−01 | −1.6932E−01 | −4.7900E−01 | −3.1357E−01 |
| A8 | −2.4045E−01 | 2.8150E+00 | 5.3736E−01 | −1.6231E+00 | 2.1115E−01 | 7.3509E−01 |
| A10 | 9.2635E−01 | −1.0613E+01 | 5.2328E+00 | 1.1207E+01 | 3.4655E+00 | −6.8920E−01 |
| A12 | −1.9213E+00 | 2.5585E+01 | −3.6255E+01 | −3.4915E+01 | −1.2406E+01 | 4.0086E−01 |
| A14 | 2.1358E+00 | −4.2612E+01 | 9.9826E+01 | 6.0314E+01 | 2.3237E+01 | −1.1957E−01 |
| A16 | −9.9782E−01 | 4.8400E+01 | −1.4430E+02 | −5.3953E+01 | −2.2480E+01 | 0.0000E+00 |
| A18 | 0.0000E+00 | −3.2715E+01 | 1.0906E+02 | 1.9331E+01 | 8.5121E+00 | 0.0000E+00 |
| A20 | 0.0000E+00 | 9.5845E+00 | −3.4161E+01 | 0.0000E+00 | 0.0000E+00 | 0.0000E+00 |

| Surface number | 7 | 8 | 9 | 10 | 11 | 12 |
|---|---|---|---|---|---|---|
| K | 5.0000E+01 | −3.6362E+01 | −1.0568E+01 | −3.7709E+01 | −4.0000E+01 | −6.8352E+00 |
| A4 | −1.1353E−01 | −2.0852E−01 | −1.0588E−02 | 2.0025E−02 | −3.5143E−01 | −2.1653E−01 |
| A6 | 3.1758E−01 | 1.3322E−01 | −2.0968E−01 | −6.1092E−02 | 1.8348E−01 | 1.7098E−01 |
| A8 | −1.4278E+00 | 1.4459E−01 | 4.8012E−01 | 6.6493E−02 | −3.0647E−02 | −1.0105E−01 |
| A10 | 5.3254E+00 | −5.6250E−01 | −6.6756E−01 | −2.3742E−02 | 9.7688E−04 | 4.3355E−02 |
| A12 | −1.3324E+01 | 8.4904E−01 | 5.8798E−01 | −6.7859E−03 | −1.8451E−03 | −1.3143E−02 |
| A14 | 2.1089E+01 | −7.6073E−01 | −3.3269E−01 | 8.1011E−03 | 1.1502E−03 | 2.6665E−03 |
| A16 | −2.0474E+01 | 4.0844E−01 | 1.1458E−01 | −2.6385E−03 | −2.6050E−04 | −3.3869E−04 |
| A18 | 1.1123E+01 | −1.2024E−01 | −2.1437E−02 | 3.8754E−04 | 2.7000E−05 | 2.4202E−05 |
| A20 | −2.5955E+00 | 1.4854E−02 | 1.6531E−03 | −2.1919E−05 | −1.0909E−06 | −7.4134E−07 |

In addition, according to the parameter information provided above, the following relations can be derived:

$CT1/SD11=0.82$; $TTL/CT1=6.84$; $FNO=2.41$; $|f3/f4|=3.148$;

$|f4/f1|+|f5/f6|=3.21$; $f/f12=1.10$; $TT/ImgH=1.07$; $R9/R10=-1.00$;

$|f6|/R12=1.87$; $CT5/|SAG51|=4.26$.

Fifth Embodiment

Figure 9:
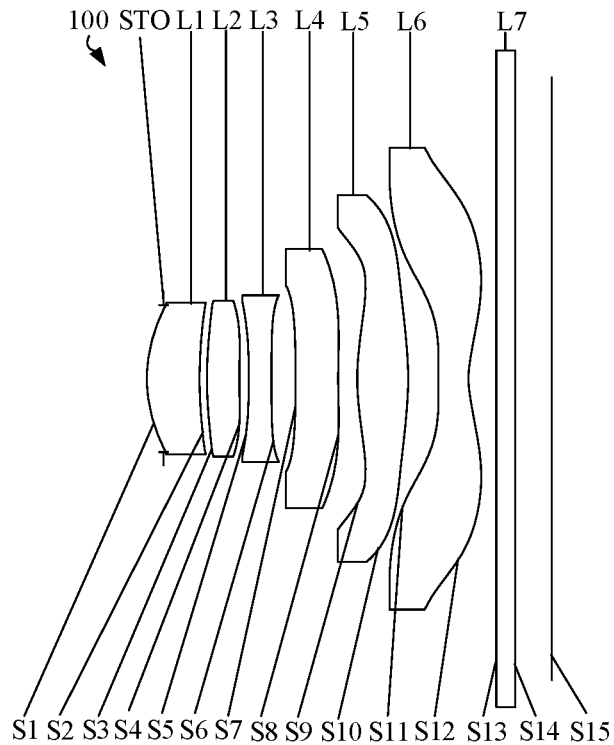
FIG. 9 is a schematic view of an optical system in a fifth embodiment of the present disclosure.
Figure 10:
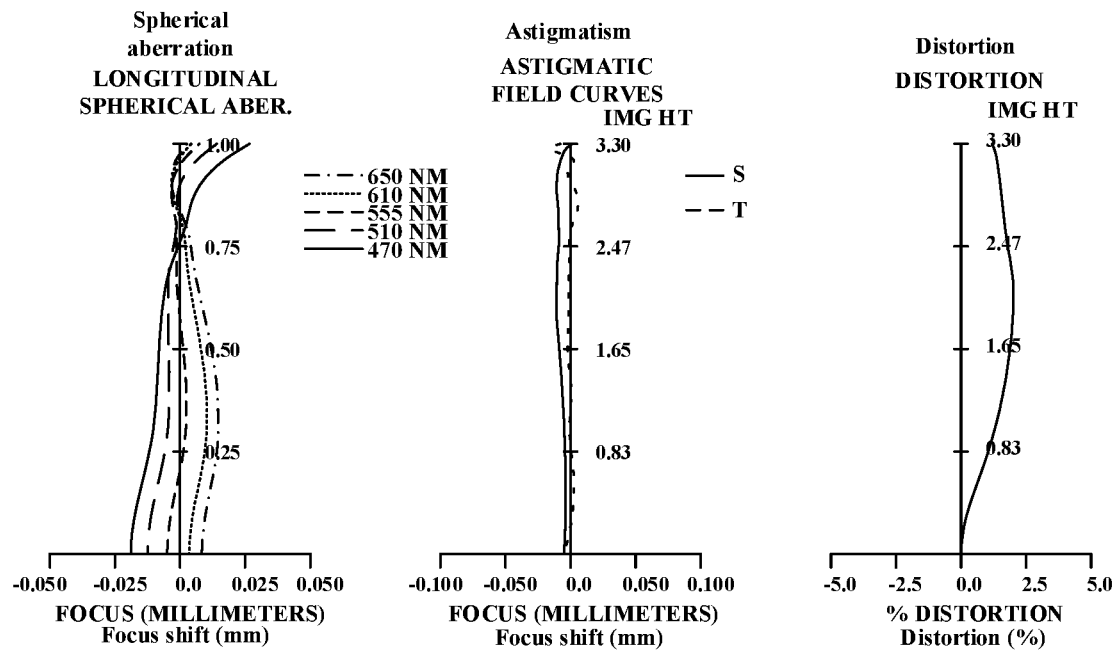
FIG. 10 is graphs of spherical aberration, astigmatism, and distortion of the optical system in the fifth embodiment of the present disclosure.

Referring to FIGS. 9 and 10, FIG. 9 is a schematic view of an optical system 100 in the fifth embodiment. The optical system 100 includes, sequentially arranged from an object side to an image side, an optical stop STO, a first lens L1 having a positive refractive power, a second lens L2 having a positive refractive power, a third lens L3 having a negative refractive power, a fourth lens L4 having a negative refractive power, a fifth lens L5 having a positive refractive power, and a sixth lens L6 having a negative refractive power. FIG.

10 is, sequentially from left to right, graphs of spherical aberration, astigmatism, and distortion of the optical system 100 in the fifth embodiment.

An object side surface S1 of the first lens L1 is convex at its paraxial position and convex at its circumference.

An image side surface S2 of the first lens L1 is concave at its paraxial position and concave at its circumference.

An object side surface S3 of the second lens L2 is convex at its paraxial position and convex at its circumference.

An image side surface S4 of the second lens L2 is concave at its paraxial position and convex at its circumference.

An object side surface S5 of the third lens L3 is concave at its paraxial position and concave at its circumference.

An image side surface S6 of the third lens L3 is concave at its paraxial position and concave at its circumference.

An object side surface S7 of the fourth lens L4 is concave at its paraxial position and concave at its circumference.

An image side surface S8 of the fourth lens L4 is concave at its paraxial position and convex at its circumference.

An object side surface S9 of the fifth lens L5 is convex at its paraxial position and concave at its circumference.

An image side surface S10 of the fifth lens L5 is convex at its paraxial position and convex at its circumference.

An object side surface S11 of the sixth lens L6 is convex at its paraxial position and convex at its circumference.

An image side surface S12 of the sixth lens L6 is concave at its paraxial position and concave at its circumference.

The object side surfaces and the image side surfaces of the first lens L1, the second lens L2, the third lens L3, the fourth lens L4, the fifth lens L5, and the sixth lens L6 are all aspherical.

The first lens L1, the second lens L2, the third lens L3, the fourth lens L4, the fifth lens L5, and the sixth lens L6 are all made of plastic.

In addition, various parameters of the optical system 100 are given in Table 9, in which definitions of the various parameters can be obtained from the first embodiment, which will not be repeated here.

TABLE 9

Fifth Embodiment
f = 3.72 mm, FNO = 2.35, HFOV = 40.7°, TTL = 4.476 mm

| Surface number | Surface name | Surface shape | Y radius (mm) | Thickness (mm) | Material | Refractive index | Abbe number | Focal length (mm) |
|---|---|---|---|---|---|---|---|---|
|  | Object plane | Spherical | Infinite | 400 |  |  |  |  |
|  | Optical stop | Spherical | Infinite | −0.186 |  |  |  |  |
| 1 |  | Aspherical | 1.595 | 0.582 | Plastic | 1.546 | 56.14 | 4.16 |
| 2 | First lens | Aspherical | 4.661 | 0.082 |  |  |  |  |
| 3 |  | Aspherical | 4.380 | 0.359 | Plastic | 1.546 | 56.14 | 12.48 |
| 4 | Second lens | Aspherical | 11.905 | 0.104 |  |  |  |  |
| 5 |  | Aspherical | −11.376 | 0.250 | Plastic | 1.666 | 20.37 | −13.62 |
| 6 | Third lens | Aspherical | 45.334 | 0.267 |  |  |  |  |
| 7 |  | Aspherical | −36.340 | 0.469 | Plastic | 1.645 | 23.54 | −7.98 |
| 8 | Fourth lens | Aspherical | 6.019 | 0.213 |  |  |  |  |
| 9 |  | Aspherical | 2.792 | 0.563 | Plastic | 1.546 | 56.14 | 2.84 |
| 10 | Fifth lens | Aspherical | −3.239 | 0.335 |  |  |  |  |
| 11 |  | Aspherical | 42.968 | 0.332 | Plastic | 1.546 | 56.14 | −2.41 |
| 12 | Sixth lens | Aspherical | 1.273 | 0.306 |  |  |  |  |
| 13 | Infrared | Spherical | Infinite | 0.210 | Glass | 1.518 | 64.17 |  |
| 14 | filter | Spherical | Infinite | 0.405 |  |  |  |  |
| 15 | Image plane | Spherical | Infinite | 0.000 |  |  |  |  |

Further, the aspheric coefficients of the image side surfaces or the object side surfaces of the lenses of the optical system 100 are given in Table 10, in which definitions of the various parameters can be obtained from the first embodiment, which will not be repeated here.

TABLE 10

Fifth Embodiment
Aspheric coefficient

| Surface number | 1 | 2 | 3 | 4 | 5 | 6 |
|---|---|---|---|---|---|---|
| K | −4.5063E+00 | −2.7815E+01 | −2.9778E+01 | −5.0000E+01 | −5.0000E+01 | −5.0000E+01 |
| A4 | 1.2343E−01 | 1.7025E−02 | 1.5768E−02 | −1.0198E−01 | −2.9724E−02 | 7.8166E−02 |
| A6 | −3.5574E−02 | −1.5097E−01 | −1.1558E−01 | −3.5503E−01 | −4.5040E−01 | −1.3055E−01 |
| A8 | −1.4887E−01 | 8.6413E−01 | 2.9603E−01 | 5.0015E−01 | 1.0993E+00 | 3.0334E−01 |
| A10 | 5.5035E−01 | −4.0326E+00 | −6.5899E−01 | −4.9904E−01 | −2.5839E+00 | −1.7700E−01 |
| A12 | −9.6839E−01 | 1.2887E+01 | 4.7754E−01 | −5.3923E−01 | 5.5318E+00 | 8.3462E−02 |
| A14 | 8.4884E−01 | −2.5792E+01 | 1.9889E+00 | 4.3659E+00 | −5.7332E+00 | −3.5624E−02 |
| A16 | −2.9575E−01 | 2.9776E+01 | −6.9951E+00 | −6.5371E+00 | 2.0932E+00 | 0.0000E+00 |
| A18 | 0.0000E+00 | −1.7176E+01 | 9.3333E+00 | 3.1102E+00 | 3.8153E−03 | 0.0000E+00 |
| A20 | 0.0000E+00 | 3.7324E+00 | −4.2858E+00 | 0.0000E+00 | 0.0000E+00 | 0.0000E+00 |

TABLE 10-continued

Fifth Embodiment
Aspheric coefficient

| Surface number | 7 | 8 | 9 | 10 | 11 | 12 |
|---|---|---|---|---|---|---|
| K   | 5.0000E+01  | −4.0000E+01 | −1.0471E+01 | −4.0000E+01 | −4.0000E+01 | −6.6000E+00 |
| A4  | −1.1855E−01 | −2.3157E−01 | −2.6293E−02 | 5.9267E−02  | −3.5643E−01 | −2.2035E−01 |
| A6  | 3.1379E−01  | 2.7801E−01  | −1.1601E−01 | −1.4506E−01 | 1.8077E−01  | 1.7447E−01  |
| A8  | −1.1106E+00 | −3.3070E−01 | 2.6617E−01  | 1.8389E−01  | −2.1699E−02 | −1.0091E−01 |
| A10 | 3.1337E+00  | 3.3921E−01  | −3.5516E−01 | −1.2213E−01 | −4.7093E−03 | 4.1607E−02  |
| A12 | −6.4922E+00 | −2.6336E−01 | 2.9292E−01  | 4.2033E−02  | −2.6320E−04 | −1.1985E−02 |
| A14 | 9.0173E+00  | 1.4073E−01  | −1.5578E−01 | −6.3361E−03 | 9.6616E−04  | 2.3053E−03  |
| A16 | −7.9609E+00 | −4.8976E−02 | 5.0456E−02  | −1.6693E−04 | −2.6272E−04 | −2.7954E−04 |
| A18 | 4.0233E+00  | 1.0470E−02  | −8.7868E−03 | 1.6715E−04  | 2.9382E−05  | 1.9344E−05  |
| A20 | −8.8841E−01 | −1.1096E−03 | 6.1879E−04  | −1.4419E−05 | −1.2429E−06 | −5.8448E−07 |

In addition, according to the parameter information provided above, the following relations can be derived:

CT1/SD11=0.712; TTL/CT1=7.69; FNO=2.35; |f3/f4|=1.707;

|f4/f1|+|f5/f6|=3.10; f/f12=1.16; TT/ImgH=1.08; R9/R10=−0.86;

|f6|/R12=1.89; CT5/|SAG51|=2.61.

Sixth Embodiment

Figure 11:
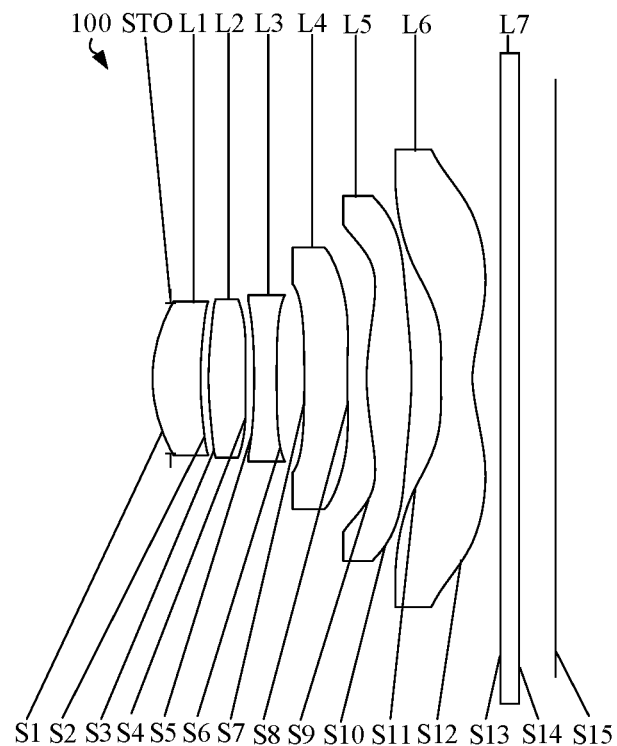
FIG. 11 is a schematic view of an optical system in a sixth embodiment of the present disclosure.
Figure 12:
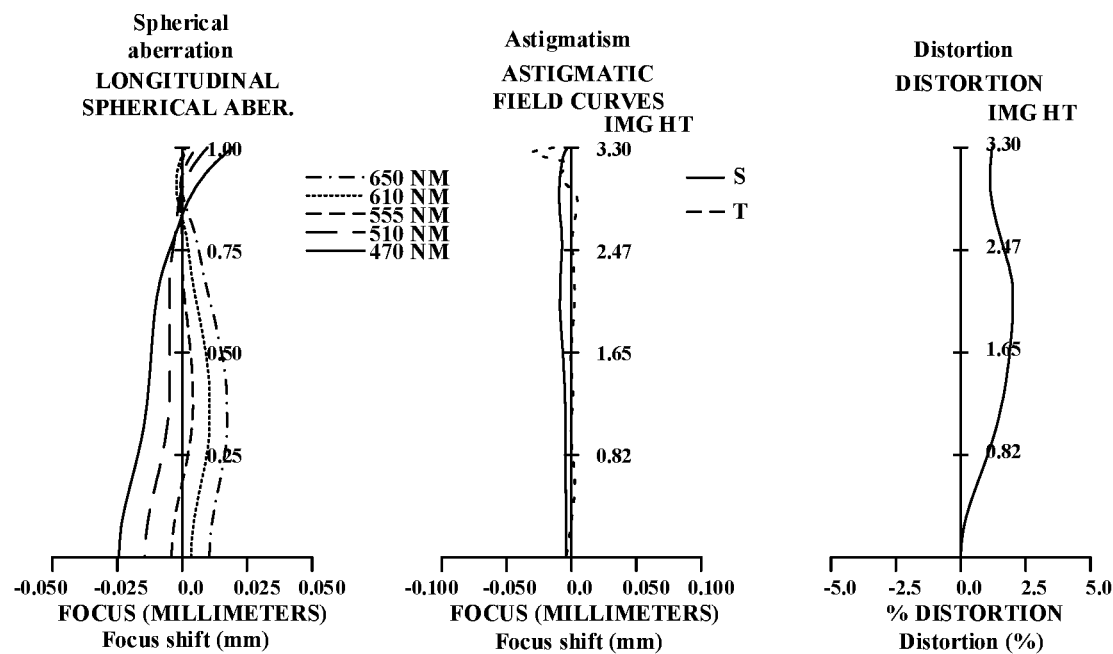
FIG. 12 is graphs of spherical aberration, astigmatism, and distortion of the optical system in the sixth embodiment of the present disclosure.

Referring to FIGS. 11 and 12, FIG. 11 is a schematic view of an optical system 100 in the sixth embodiment. The optical system 100 includes, sequentially arranged from an object side to an image side, an optical stop STO, a first lens L1 having a positive refractive power, a second lens L2 having a positive refractive power, a third lens L3 having a negative refractive power, a fourth lens L4 having a negative refractive power, a fifth lens L5 having a positive refractive power, and a sixth lens L6 having a negative refractive power. FIG. 12 is, sequentially from left to right, graphs of spherical aberration, astigmatism, and distortion of the optical system 100 in the sixth embodiment.

An object side surface S1 of the first lens L1 is convex at its paraxial position and convex at its circumference.

An image side surface S2 of the first lens L1 is concave at its paraxial position and concave at its circumference.

An object side surface S3 of the second lens L2 is convex at its paraxial position and convex at its circumference.

An image side surface S4 of the second lens L2 is concave at its paraxial position and convex at its circumference.

An object side surface S5 of the third lens L3 is concave at its paraxial position and concave at its circumference.

An image side surface S6 of the third lens L3 is concave at its paraxial position and concave at its circumference.

An object side surface S7 of the fourth lens L4 is concave at its paraxial position and concave at its circumference.

An image side surface S8 of the fourth lens L4 is concave at its paraxial position and convex at its circumference.

An object side surface S9 of the fifth lens L5 is convex at its paraxial position and concave at its circumference.

An image side surface S10 of the fifth lens L5 is convex at its paraxial position and convex at its circumference.

An object side surface S11 of the sixth lens L6 is convex at its paraxial position and convex at its circumference.

An image side surface S12 of the sixth lens L6 is concave at its paraxial position and concave at its circumference.

The object side surfaces and the image side surfaces of the first lens L1, the second lens L2, the third lens L3, the fourth lens L4, the fifth lens L5, and the sixth lens L6 are all aspherical.

The first lens L1, the second lens L2, the third lens L3, the fourth lens L4, the fifth lens L5, and the sixth lens L6 are all made of plastic.

In addition, various parameters of the optical system 100 are given in Table 11, in which definitions of the various parameters can be obtained from the first embodiment, which will not be repeated here.

TABLE 11

Sixth Embodiment
f = 3.77 mm, FNO = 2.3, HFOV = 40.4°, TTL = 4.5 mm

| Surface number | Surface name | Surface shape | Y radius (mm) | Thickness (mm) | Material | Refractive index | Abbe number | Focal length (mm) |
|---|---|---|---|---|---|---|---|---|
|    | Object plane | Spherical  | Infinite | 400    |         |       |       |        |
|    | Optical stop | Spherical  | Infinite | −0.201 |         |       |       |        |
| 1  |              | Aspherical | 1.592    | 0.536  | Plastic | 1.546 | 56.14 | 4.48   |
| 2  | First lens   | Aspherical | 4.018    | 0.090  |         |       |       |        |
| 3  |              | Aspherical | 3.981    | 0.410  | Plastic | 1.546 | 56.14 | 9.90   |
| 4  | Second lens  | Aspherical | 14.560   | 0.098  |         |       |       |        |
| 5  |              | Aspherical | −13.756  | 0.251  | Plastic | 1.666 | 20.37 | −11.84 |
| 6  | Third lens   | Aspherical | 18.630   | 0.308  |         |       |       |        |
| 7  |              | Aspherical | −67.607  | 0.480  | Plastic | 1.640 | 23.80 | −8.86  |
| 8  | Fourth lens  | Aspherical | 6.207    | 0.217  |         |       |       |        |
| 9  |              | Aspherical | 2.709    | 0.500  | Plastic | 1.535 | 55.71 | 3.00   |
| 10 | Fifth lens   | Aspherical | −3.757   | 0.330  |         |       |       |        |
| 11 |              | Aspherical | 18.560   | 0.350  | Plastic | 1.546 | 56.14 | −2.52  |
| 12 | Sixth lens   | Aspherical | 1.273    | 0.311  |         |       |       |        |
| 13 | Infrared     | Spherical  | Infinite | 0.210  | Glass   | 1.518 | 64.17 |        |

TABLE 11-continued

Sixth Embodiment
f = 3.77 mm, FNO = 2.3, HFOV = 40.4°, TTL = 4.5 mm

| Surface number | Surface name | Surface shape | Y radius (mm) | Thickness (mm) | Material | Refractive index | Abbe number | Focal length (mm) |
|---|---|---|---|---|---|---|---|---|
| 14 | filter | Spherical | Infinite | 0.409 | | | | |
| 15 | Image plane | Spherical | Infinite | 0.000 | | | | |

Further, the aspheric coefficients of the image side surfaces or the object side surfaces of the lenses of the optical system 100 are given in Table 12, in which definitions of the various parameters can be obtained from the first embodiment, which will not be repeated here.

TABLE 12

Sixth Embodiment
Aspheric coefficient

| Surface number | 1 | 2 | 3 | 4 | 5 | 6 |
|---|---|---|---|---|---|---|
| K | −4.4726E+00 | −2.4162E+01 | −3.3216E+01 | −5.0000E+01 | −5.0000E+01 | −5.0000E+01 |
| A4 | 1.2661E−01 | 9.4027E−03 | 5.8523E−03 | −1.2024E−01 | −4.8794E−02 | 5.1690E−02 |
| A6 | −7.4934E−02 | −8.3875E−03 | 5.6976E−02 | −2.1807E−01 | −2.2636E−01 | −8.8972E−03 |
| A8 | 8.6067E−02 | −3.2284E−01 | −1.1052E+00 | 1.7108E−02 | 3.9936E−01 | 9.3582E−02 |
| A10 | −1.8805E−01 | 2.1611E+00 | 5.7261E+00 | 9.3191E−01 | −7.0685E−01 | −5.1410E−02 |
| A12 | 3.4540E−01 | −7.9428E+00 | −1.7757E+01 | −3.6823E+00 | 1.1541E+00 | 7.1390E−02 |
| A14 | −3.7349E−01 | 1.8393E+01 | 3.4405E+01 | 8.3660E+00 | 3.7784E−01 | −4.1583E−02 |
| A16 | 1.6987E−01 | −2.6033E+01 | −4.0595E+01 | −9.0180E+00 | −2.2093E+00 | 0.0000E+00 |
| A18 | 0.0000E+00 | 2.0714E+01 | 2.7186E+01 | 3.6235E+00 | 1.2001E+00 | 0.0000E+00 |
| A20 | 0.0000E+00 | −6.8634E+00 | −7.8454E+00 | 0.0000E+00 | 0.0000E+00 | 0.0000E+00 |

| Surface number | 7 | 8 | 9 | 10 | 11 | 12 |
|---|---|---|---|---|---|---|
| K | 5.0000E+01 | −4.0000E+01 | −1.0890E+01 | −4.0000E+01 | −4.0000E+01 | −6.2349E+00 |
| A4 | −1.4047E−01 | −2.4745E−01 | −2.5410E−02 | 8.9961E−02 | −3.5416E−01 | −2.1720E−01 |
| A6 | 3.1960E−01 | 2.8686E−01 | −1.2123E−01 | −2.3028E−01 | 1.5534E−01 | 1.6727E−01 |
| A8 | −1.0713E+00 | −3.2850E−01 | 2.9350E−01 | 3.3376E−01 | 1.6774E−02 | −9.3517E−02 |
| A10 | 2.9599E+00 | 2.9330E−01 | −4.0252E−02 | −2.7518E−01 | −3.0863E−02 | 3.7000E−02 |
| A12 | −6.0215E+00 | −1.6961E−01 | 3.3431E−01 | 1.3450E−01 | 9.5608E−03 | −1.0122E−02 |
| A14 | 8.2085E+00 | 4.7643E−02 | −1.7849E−01 | −4.0166E−02 | −1.2251E−03 | 1.8270E−03 |
| A16 | −7.1168E+00 | 2.2121E−03 | 5.8899E−02 | 7.2234E−03 | 2.7664E−05 | −2.0558E−04 |
| A18 | 3.5386E+00 | −4.5285E−03 | −1.0723E−02 | −7.2244E−04 | 8.1923E−06 | 1.3101E−05 |
| A20 | −7.7088E−01 | 7.1432E−04 | 8.1619E−04 | 3.1108E−05 | −5.8557E−07 | −3.6432E−07 |

In addition, according to the parameter information provided above, the following relations can be derived:

$CT1/SD11=0.636; TTL/CT1=8.4; FNO=2.30; |f3/f4|=1.336;$ $|f4/f1|+|f5/f6|=3.17; f/f12=1.18; TT/ImgH=1.08; R9/R10=-0.72;$ $|f6|/R12=1.98; CT5/|SAG51|=1.91.$

Figure 13:
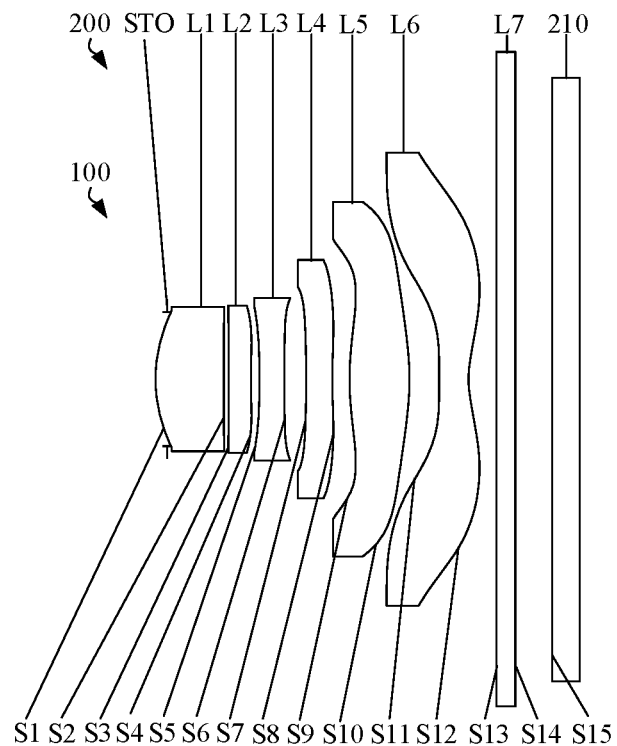
FIG. 13 is a schematic view of an image capturing module in an embodiment of the present disclosure.

Referring to FIG. 13, in some embodiments, the optical system 100 can be assembled with a photosensitive element 210 to form an image capturing module 200. In this case, a photosensitive surface of the photosensitive element 210 can be regarded as the image plane S15 of the optical system 100. The image capturing module 200 may further be provided with an infrared filter L7, and the infrared filter L7 is arranged between the image side surface S12 of the sixth lens L6 and the image plane S15. Specifically, the photosensitive element 210 may be a Charge Coupled Device (CCD) or a Complementary Metal-Oxide Semiconductor Sensor (CMOS Sensor). The optical system 100 is used in the image capturing module 200 to enable the head of the camera lens being smaller, which can meet the requirements of miniaturization design of electronic devices.

Figure 14:
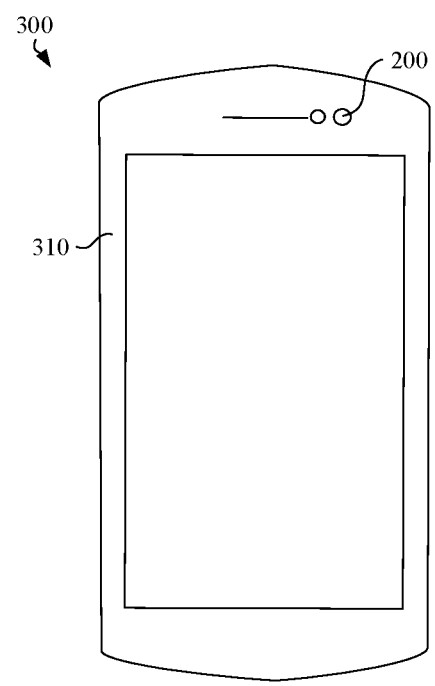
FIG. 14 is a schematic view of an electronic device in an embodiment of the present disclosure.

Referring to FIG. 14, in some embodiments, the image capturing module 200 may be applied to an electronic device 300. The electronic device includes a housing 310, and the image capturing module 200 is mounted on the housing 310. Specifically, the electronic device 300 may be, but is not limited to, a mobile phone, a video phone, a smart phone, an electronic book reader, a vehicle-mounted camera device such as a car recorder, or a wearable device such as a smart watch. The image capturing module 200 is used in the electronic device 300, so that the head of the lens in the electronic device 300 is relatively small, which can meet the requirements of the miniaturization design of the electronic device 300. Further, it can be understood that, in some embodiments, when the electronic device 300 is a smart phone, the lens of the electronic device 300 can be mounted in the housing 310 in an under-screen package manner. In this case, an opening needs to be defined in the screen of the electronic device 300 to expose the lens, so that light rays from the outside of the electronic device 300 can enter the inside of the electronic device 300 through the optical system 100 and form an image on the photosensitive surface of the photosensitive element 210. The above image capturing module 200 is used in the electronic device 300, so that the head of the lens is relatively small, and the lens can be exposed when the opening in the screen of the electronic device 300 is smaller, thereby increasing the screen-to-body ratio of the electronic device 300, and further meeting the requirements of the miniaturization design of the electronic device 300.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inside", "outside", "clockwise", "counter-clockwise", "axial", "radial", "circumferential", etc. indicate that the orientation or positional relationship is based on the orientation or positional relationship shown in the drawings, which is only for the purpose of facilitating the description of the present disclosure and simplifying the description, rather than indicating or implying that the device or elements must have a specific orientation, be constructed and operated in a specific orientation, and therefore cannot be construed as limitation of the present disclosure.

In addition, the terms "first" and "second" are used for purposes of description only, and cannot be understood to indicate or imply relative importance or implicitly indicate the number of technical features indicated. Therefore, the features defined "first" and "second" may explicitly or implicitly include at least one of the features. In the description of the present disclosure, the term "plurality" means at least two, such as two, three, etc., unless specifically defined otherwise.

In the present disclosure, unless otherwise clearly specified and limited, the term such as "mounted", "interconnected", "connected", "fixed" should be understood in a broad sense, for example, it can be a fixed connection or a detachable connection, or integrated; may be a mechanical connection or an electrical connection; may be a direct connection, or may be an indirect connection through an intermediate, may be a communication between two components or an interaction between two components, unless otherwise specified. Those ordinary skilled in the art can understand the specific meanings of the above terms in the present disclosure according to specific situations.

In the present disclosure, unless otherwise clearly specified and defined, the expression that a first feature is "above" or "below" a second feature may indicate that the first and second features are in direct contact, or the first and second features are in indirectly contact through an intermediate. The first feature is "at the top of", "above", and "over" the second feature may indicate that the first feature is directly or obliquely above the second feature, or only indicate that a level height of the first feature is higher than that of the second feature. The expression that a first feature is "beneath", "below", and "under" the second feature may indicate that the first feature is directly or obliquely below the second feature, or only indicates that the horizontal height of the first feature is lower than that of the second feature.

In the description of the present specification, descriptions with reference to the terms such as "an embodiment", "some embodiments", "examples", "specific examples", or "some examples" mean the specific features, structures, materials or characteristics described in conjunction with these embodiments or examples are included in at least one embodiment or example of the present disclosure. In the present specification, the schematic representations for the above terms do not necessarily refer to the same embodiment or example. Moreover, the described specific features, structures, materials or characteristics can be combined in any one or more embodiments or examples in a suitable manner. In addition, those skilled in the art can combine the different embodiments or examples and the features of the different embodiments or examples described in this specification without contradicting each other.

The technical features of the above embodiments can be combined arbitrarily. For concise description, not all possible combinations of the technical features in the above embodiments are described, but all of which should be considered to be within the scope described in this specification, as long as there is no contradiction between them.

The above-mentioned embodiments are merely illustrative of several embodiments of the present disclosure, which are described specifically and in detail, and cannot be understood to limit the scope of the present disclosure. It should be noted that, for those ordinary skilled in the art, several variations and improvements may be made without departing from the concept of the present disclosure, and these are all within the protection scope of the present disclosure. Therefore, the protection scope of the present disclosure shall be subject to the appended claims.

What is claimed is:

1. An optical system, sequentially arranged from an object side to an image side, comprising:
   a first lens having a positive refractive power;
   a second lens having a refractive power;
   a third lens having a negative refractive power, an object side surface and an image side surface of the third lens being both concave at circumferences thereof;
   a fourth lens having a negative refractive power;
   a fifth lens having a positive refractive power, at least one of an object side surface and an image side surface of the fifth lens having an inflection point; and
   a sixth lens having a negative refractive power;
   wherein the optical system satisfies the following relational expressions:

$0.60 < CT1/SD11 < 1.01;$ $5.5 < TTL/CT1 \leq 6.84;$ and $2.2 \leq FNO \leq 2.6;$ wherein, CT1 is a thickness of the first lens on an optical axis, SD11 is half of a maximum effective aperture of an object side surface of the first lens, TTL is a distance from the object side surface of the first lens to an imaging plane of the optical system on the optical axis, and FNO is an f-number of the optical system.

2. The optical system according to claim 1, wherein the optical system satisfies the following relational expression:

$3.148 \leq |f3/f4| < 10;$ wherein, f3 is an effective focal length of the third lens, and f4 is an effective focal length of the fourth lens.

3. The optical system according to claim 1, wherein the optical system satisfies the following relational expression:

$2.0 < |f4/f1| + |f5/f6| < 4.0;$ wherein, f1 is an effective focal length of the first lens, f4 is an effective focal length of the fourth lens, f5 is an effective focal length of the fifth lens, and f6 is an effective focal length of the sixth lens.

4. The optical system according to claim 1, wherein the optical system satisfies the following relational expression:

$1.0 < f/f12 < 1.5;$ wherein, f is a total effective focal length of the optical system, and f12 is a combined focal length of the first lens and the second lens.

5. The optical system according to claim 1, wherein the optical system satisfies the following relational expression:

$TT/ImgH<1.1$;

wherein, TT is a distance from the object side surface of the first lens to an image side surface of the sixth lens on the optical axis, and ImgH is half of a diagonal length of an effective pixel area of the optical system on the imaging plane.

6. The optical system according to claim 1, wherein the optical system satisfies the following relational expression:

$-1.5<R9/R10<0$;

wherein, R9 is a radius of curvature of the object side surface of the fifth lens at the optical axis, and R10 is a radius of curvature of the image side surface of the fifth lens at the optical axis.

7. The optical system according to claim 1, wherein the optical system satisfies the following relational expression:

$1<|f6|/R12<2$;

wherein, f6 is an effective focal length of the sixth lens, and R12 is a radius of curvature of an image side surface of the sixth lens at the optical axis.

8. The optical system according to claim 1, wherein the optical system satisfies the following relational expression:

$1.0<CT5/|SAG51|<5.0$;

wherein, CT5 is a thickness of the fifth lens on the optical axis, and SAG51 is a sagittal height of the object side surface of the fifth lens.

9. The optical system according to claim 1, further comprising an optical stop arranged on an object side of the first lens.

10. The optical system according to claim 1, further comprising an infrared cut-off filter arranged on an image side of the sixth lens.

11. The optical system according to claim 1, wherein image side surfaces and object side surfaces of the first lens, the second lens, the third lens, the fourth lens, the fifth lens, and the sixth lens are aspherical.

12. The optical system according to claim 1, wherein the first lens, the second lens, the third lens, the fourth lens, the fifth lens, and the sixth lens are made of glass.

13. The optical system according to claim 1, wherein the first lens, the second lens, the third lens, the fourth lens, the fifth lens, and the sixth lens are made of plastic.

14. An image capturing module, comprising a photosensitive element and the optical system according to claim 1, the photosensitive element being arranged on the image side of the optical system.

15. The image capturing module according to claim 14, wherein the photosensitive element is a charge coupled device or a complementary metal-oxide semiconductor sensor.

16. An electronic device, comprising a housing and the image capturing module according to claim 14, wherein the image capturing module is mounted on the housing.

17. The electronic device according to claim 16, wherein the image capturing module is mounted in the housing in an under-screen package manner.

18. An optical system, sequentially arranged from an object side to an image side, comprising:
   a first lens having a positive refractive power;
   a second lens having a refractive power;
   a third lens having a negative refractive power, an object side surface and an image side surface of the third lens being both concave at circumferences thereof;
   a fourth lens having a negative refractive power;
   a fifth lens having a positive refractive power, at least one of an object side surface and an image side surface of the fifth lens having an inflection point; and
   a sixth lens having a negative refractive power;
   wherein the optical system satisfies the following relational expressions:

$0.60<CT1/SD11<1.01$;

$5.5<TTL/CT1<9.0$; and $3.148\leq|f3/f4|<10$;

wherein, CT1 is a thickness of the first lens on an optical axis, SD11 is half of a maximum effective aperture of an object side surface of the first lens, TTL is a distance from the object side surface of the first lens to an imaging plane of the optical system on the optical axis, f3 is an effective focal length of the third lens, and f4 is an effective focal length of the fourth lens.

* * * * *